United States Patent
Standefer, III et al.

(10) Patent No.: US 10,592,557 B2
(45) Date of Patent: Mar. 17, 2020

(54) PHANTOM RESULTS IN GRAPH QUERIES

(71) Applicant: Microsoft Technology Licensing, LLC, Redmond, WA (US)

(72) Inventors: Robert Standefer, III, Duvall, WA (US); Christopher L. Mullins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 392 days.

(21) Appl. No.: 15/475,538

(22) Filed: Mar. 31, 2017

(65) Prior Publication Data
US 2018/0285480 A1    Oct. 4, 2018

(51) Int. Cl.
```
G06F 17/30      (2006.01)
G06F 16/9038    (2019.01)
G06F 16/904     (2019.01)
G06F 16/901     (2019.01)
```

(52) U.S. Cl.
CPC ........ G06F 16/9038 (2019.01); G06F 16/904 (2019.01); G06F 16/9024 (2019.01)

(58) Field of Classification Search
USPC ........................................ 707/728, 748, 758
See application file for complete search history.

(56) References Cited

U.S. PATENT DOCUMENTS

| | | | |
|---|---|---|---|
| 8,396,884 B2 | 3/2013 | Singh et al. | |
| 8,914,391 B2 * | 12/2014 | Iwama | G06F 16/24532 707/758 |
| 9,053,210 B2 | 6/2015 | Elnikety et al. | |
| 9,092,481 B2 | 7/2015 | Digana | |
| 9,378,241 B1 | 6/2016 | Shankar et al. | |
| 2015/0033106 A1 | 1/2015 | Stetson et al. | |
| 2015/0227589 A1 * | 8/2015 | Chakrabarti | G06F 16/24564 707/748 |
| 2016/0203327 A1 | 7/2016 | Akkiraju et al. | |
| 2018/0260474 A1 * | 9/2018 | Surdeanu | G06F 17/271 |

FOREIGN PATENT DOCUMENTS

| | | |
|---|---|---|
| WO | 2016159819 A1 | 10/2016 |
| WO | 2017005315 A1 | 1/2017 |

OTHER PUBLICATIONS

Flesca, et al., "Querying Graph Databases", In Proceedings of the 32nd ACM SIGMOD-SIGACT-SIGAI symposium on Principles of database systems, Jun. 22, 2013, pp. 510-524.

Kargar, et al., "eGraphSearch: Effective Keyword Search in Graphs", In Proceedings of the 25th ACM International on Conference on Information and Knowledge Management, Oct. 24, 2016, pp. 2461-2464.

* cited by examiner

*Primary Examiner* — Hung T Vy

(57) ABSTRACT

Examples of the present disclosure describe systems and methods of rendering phantom results using graph queries. In aspects, a first query may generate a first result set. The first result set may comprise ordered lists (e.g., node-edge-node 3-tuples), and may be rendered as a graph. A second query may then be executed against the data source to generate a second result set. The first and second result set may be compared. When inconsistencies between the result sets are identified, various degrees of transparency may be used in the graph to indicate the inconsistent data.

20 Claims, 16 Drawing Sheets

Query: http://.../collection300/task123?$expand=taskOn

Query: http://.../collection300/task123

Query: http://.../collection300/task123?$expand=taskOn($expand=attachmentOn)

Query: http://.../collection300/task123?$expand=taskOn($expand=attachmentOn($filter=Subject eq 'Sets'))

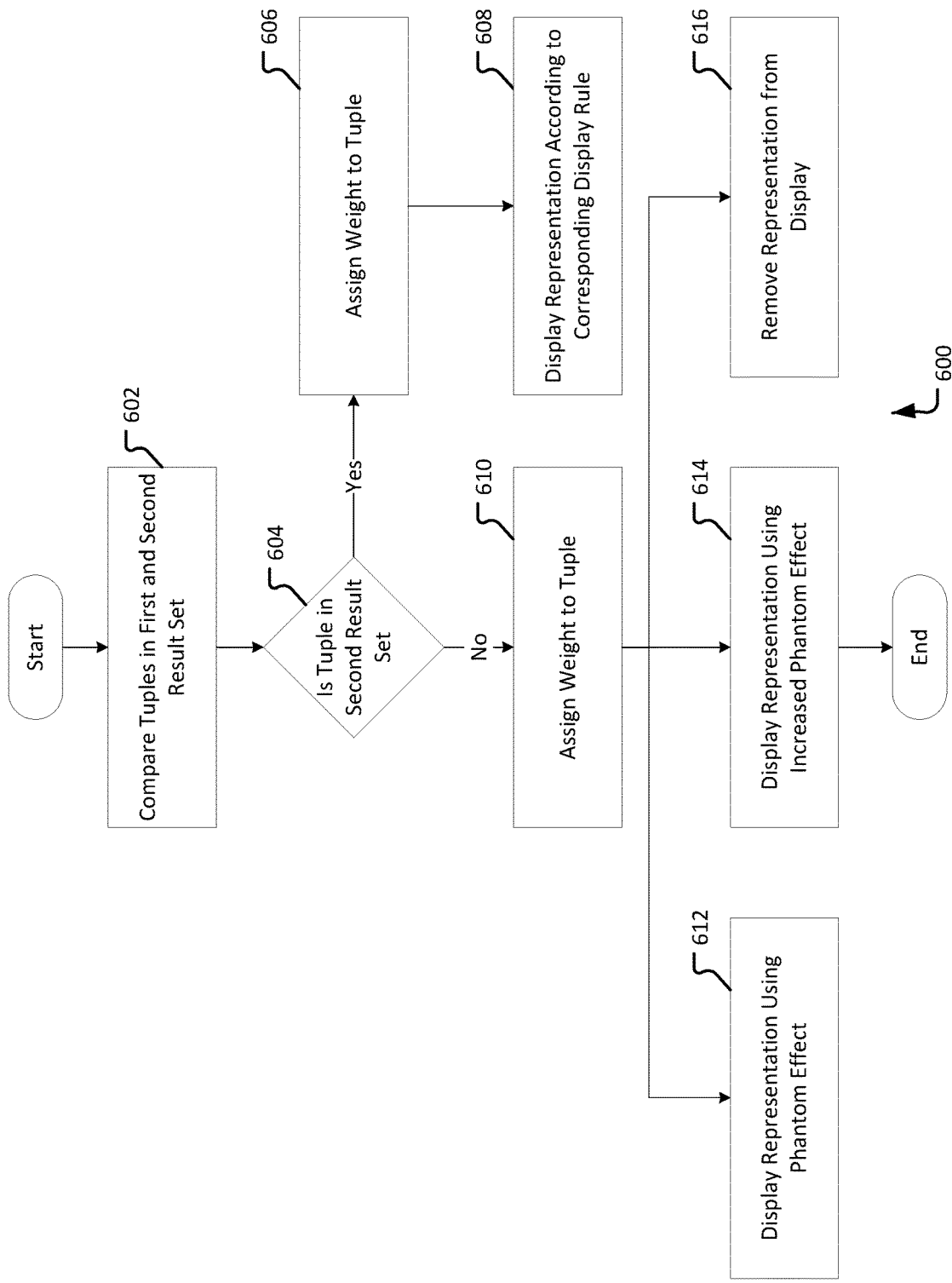

PHANTOM RESULTS IN GRAPH QUERIES

BACKGROUND

Traditional relational database management systems (RDBMS) are capable of storing vast amounts of data in a structured row/column format. A structured query language may be used to query, filter and analyze the stored data to generate structured query results. Graph databases, however, generally do not possess such structure. Instead, graph database store data in some combination of nodes and edges. As a result, the query results for a graph database are completely unstructured, difficult to iterate through and, particularly with large graph databases, nearly useless when rendered as a visual graph.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods of rendering phantom results using graph queries. In aspects, a first query executed against a data source, such as an isolated collection of resources, may generate a first result set. The first result set may comprise ordered lists (e.g., node-edge-node 3-tuples), and may be rendered in a graphical format. A representation of one or more of the ordered lists may be present in the rendered graphical format. A second query may then be executed against the data source to generate a second result set. The first result set may be compared to the second result set to determine consistencies between the ordered lists of the two result sets. In an example, when it is determined that an ordered list present in the first result set is absent from (or less relevant in) the second result set, the transparency of the representation of that absent (or less relevant) ordered list may be increased in the rendered graphical format. In another example, when it is determined that an ordered list absent from the first result set is present in the second result set, the now-present ordered list may be displayed as a new representation in the rendered graphical format. Alternately, if the now-present ordered list had been previously seen in a prior iteration of the rendered graphical format, the transparency of the representation of that absent ordered list may be decreased in the rendered graphical format.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6 illustrates an example method of applying modifications to render phantom results using an isolated collection of data as described herein.

DETAILED DESCRIPTION

Figure 1:
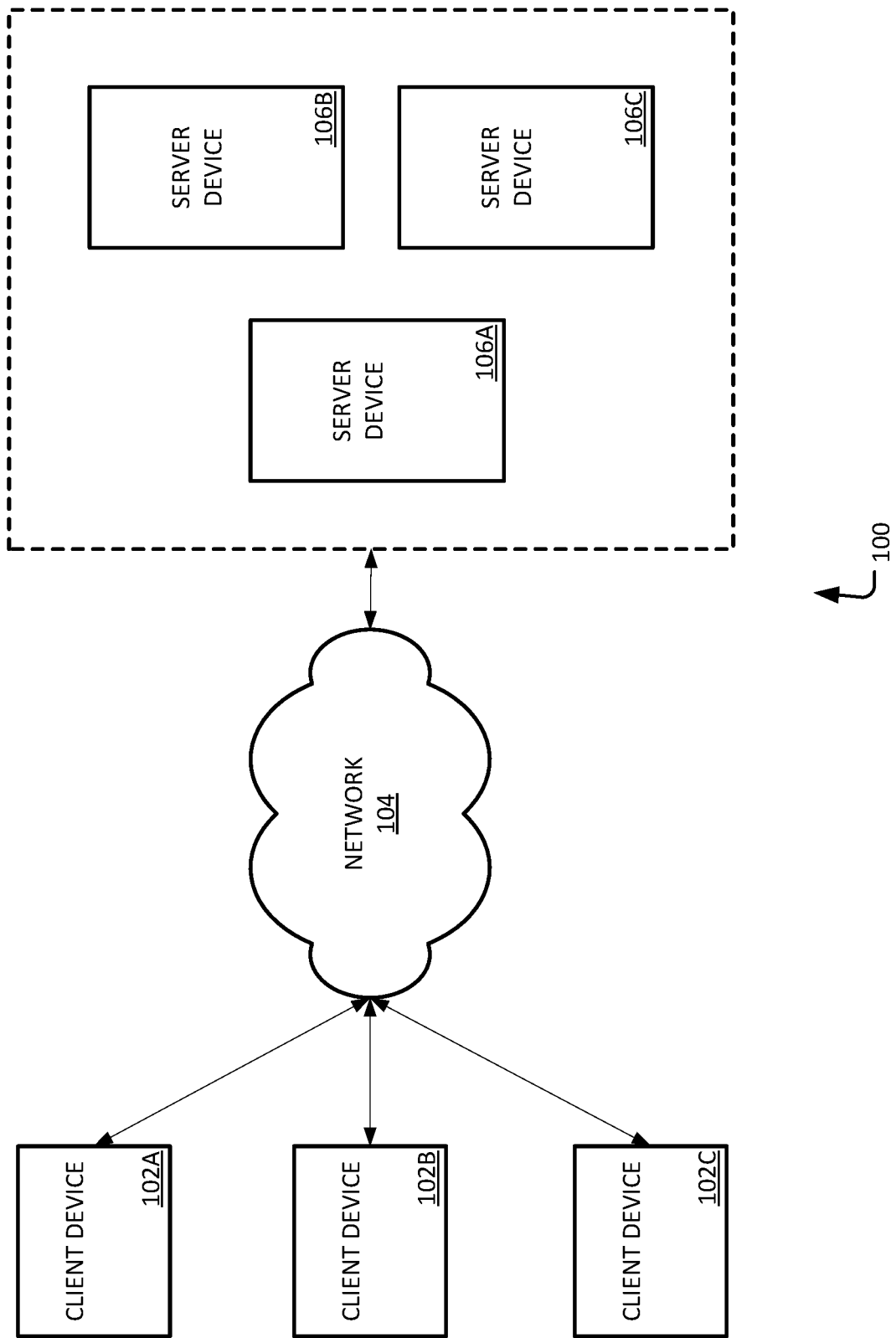
FIG. 1 illustrates an overview of an example system for implementing an isolated collection of data as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of navigating and interacting with isolated collections of data. In aspects, an application or service for interfacing with isolated collections of asserted data may be accessible to a client. An isolated collection of asserted data, as used herein, may refer to one or more asserted resources and relationships between those resources. In examples, a resource may correspond to a person, an entity, a file, a task, an electronic communication, a document (or portion thereof), a calendar event, etc. A resource may be associated with a resource identifier (e.g., uniform resource locator (URL), uniform resource name (URN), etc.). A resource identifier may identify a resource and enable interaction with representations of the resource over a network. A relationship may identity associations between one or more resources and/or resource identifiers. Such relationships may be identified and/or determined manually, using one or more rule sets, or using semantic web technologies (e.g., resource description framework (RDF), RDF schema (RDFS), SPARQL Protocol and RDF Query Language (SPARQL), Web Ontology Language (OWL), etc.).

In aspects, an isolated collection may comprise one or more resources, resource identifiers and/or relationships. An isolated collection may also comprise permission information, one or more rule sets and/or metadata (e.g., resource/relationship description properties, such as title, creator, subject, description, publisher, contributor, date, type format, identifier, source, language, relation, coverage, rights, etc.). A resource and/or a relationship (and corresponding data) may be referred to as "asserted" when the resource and/or relationship is not inferred or defined by the isolated collection. For example, a resource/relationship may be asserted if it is explicitly defined, determined by querying or interacting with a resource provider or data store, or the like. In contrast, a resource/relationship (and corresponding data) may be referred to as "inferred" when the isolated collection defines a resource/relationship (or property thereof) using one or more rules of the isolated collection. For example, a resource/relationship may be inferred if an isolated collection (or the application or service managing the isolated collection) executes one or more rules stored by (or specifically associated with) the isolated collection against asserted data stored by the isolated collection. An inferred resource or relationship may provide additional information or enriched information for asserted data (e.g., resources, resource identifiers, relationships, etc.). Inferred data may be stored in, or by, an isolated collection. An isolated collection comprising both asserted data and inferred data may be referred to as an enriched isolated collection of asserted data. As used herein, an isolated collection of asserted data and an enriched isolated collection of asserted data may be referred to as an "isolated collection" or a "Set."

The present disclosure further provides systems and methods of rendering phantom results using graph queries. In aspects, a first query may be executed against a data source to generate a first result set. The first result set may comprise ordered lists that are represented as one or more resources and/or relationships (e.g., nodes and/or edges) in a graph of the first result set. The graph may be stored and/or rendered on one or more devices. A second query may then be executed against the data source to generate a second result set comprising a set of ordered lists. The ordered lists of the first result set and the second result may be compared to determine consistencies. For example, it may be determined from the comparison that an ordered list present in the first result set is absent from the second result set. As a result, the transparency of the representation of the absent ordered list (or one or more list items thereof) may be increased (e.g., lightened or "phantomed") in the graph, or a second graph comprising the more transparent representation of the absent ordered list may be generated. In such an example, the second graph may be stored in the same location(s) as the first graph to facilitate quick traversal of the graph versions. As another example, it may be determined from the comparison that an ordered list present in the first result set has become less relevant in the second result set. As a result, the transparency of the representation of the less relevant ordered list (or one or more list items thereof) may be increased in the graph, or a second graph comprising the more transparent representation of the less relevant ordered list may be generated. As yet another example, it may be determined that an ordered list absent from the first result set is present in the second result set. As a result, the now-present ordered list may be displayed as a new resource and/or relationship in the graph. Alternately, it may be determined that the now-present ordered list was present in a previous iteration of the graph (e.g., the now-present ordered list is currently phantomed in the graph). As a result, the transparency of the representation of the now-present ordered list may be decreased (e.g., darkened or "de-phantomed") in the graph.

Accordingly, the present disclosure provides a plurality of technical benefits including but not limited to: enabling users to define and identify relationships between resources; inferring rich relationship from a small data set; creating a robust query model; enabling the execution of powerful queries on isolated collections; providing a user interface to create, manage and visualize tasks associated with isolated collections; consolidating tasks across multiple user accounts, using isolated collections to classify tasks and task types; graphically illustrating resources/relationships that have been added, removed or modified; efficiently navigating multiple iterations of graph database results; weighting/scoring result set tuples (and/or elements thereof) based on the presence of tuples in successive result sets; creating and maintaining resource-relationship rule sets to quickly construct graph, among other examples.

FIG. 1 illustrates an overview of an example system for implementing an isolated collection as described herein. Example system 100 may be a combination of interdependent components that interact to form an integrated whole for performing task management. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 7-10. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch, and text input. The interface component may enable the creation, modification, and navigation of various datasets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more of server devices 106A-C and are accessible by the client devices 102A-C via a network connection, such as distributed network 104. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to provide task management for tasks, activities and/or events associated with the various datasets. In aspects, the interface component may additionally or alternately enable the creation, modification, navigation and/or querying of one or more user accounts. The user accounts may comprise (or be associated with) tasks and activities that were created by, or are particular to, a specific user account. The user accounts may store the tasks in one or more data stores, such as datasets described above. Alternately, the user accounts may simply have access to data stores where tasks are stored. For example, datasets may comprise tasks (and associated data) and indicators of task storage locations. Such indicators may refer to local locations, remote locations, or some combination thereof. Client devices 102A-C may query the task storage locations for tasks and related information corresponding to one or user accounts. Client devices 102A-C may collect and aggregate the query results for the task storage locations. The aggregated query results may be analyzed to generate rich task data, and/or to determine associations between tasks, associations between tasks and users, task dependencies, task classifications, task priority levels, task statuses, task optimizations, task resource allocations, etc. Client devices 102A-C may then generate or receive a result for the queried user accounts and/or user tasks. The result may be presented to a user via, for example, the interface component.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authorization mechanisms. In some aspects, server devices 106A-C may be configured to store at least a portion of the various data sets and graphical representations, as discussed above. Server devices 106A-C may be further configured to provide analysis services. For example, server devices 106A-C may comprise, or have access to, an analysis component. The analysis component may have access to, for example, task data for a user or one or more user accounts. The analysis component may apply machine learning techniques to the task data to determine one or more associations, classification, or priorities in the task data. In examples, server devices 106A-C may provide the determinations (or an aspect thereof) to a task management application or service.

Figure 2:
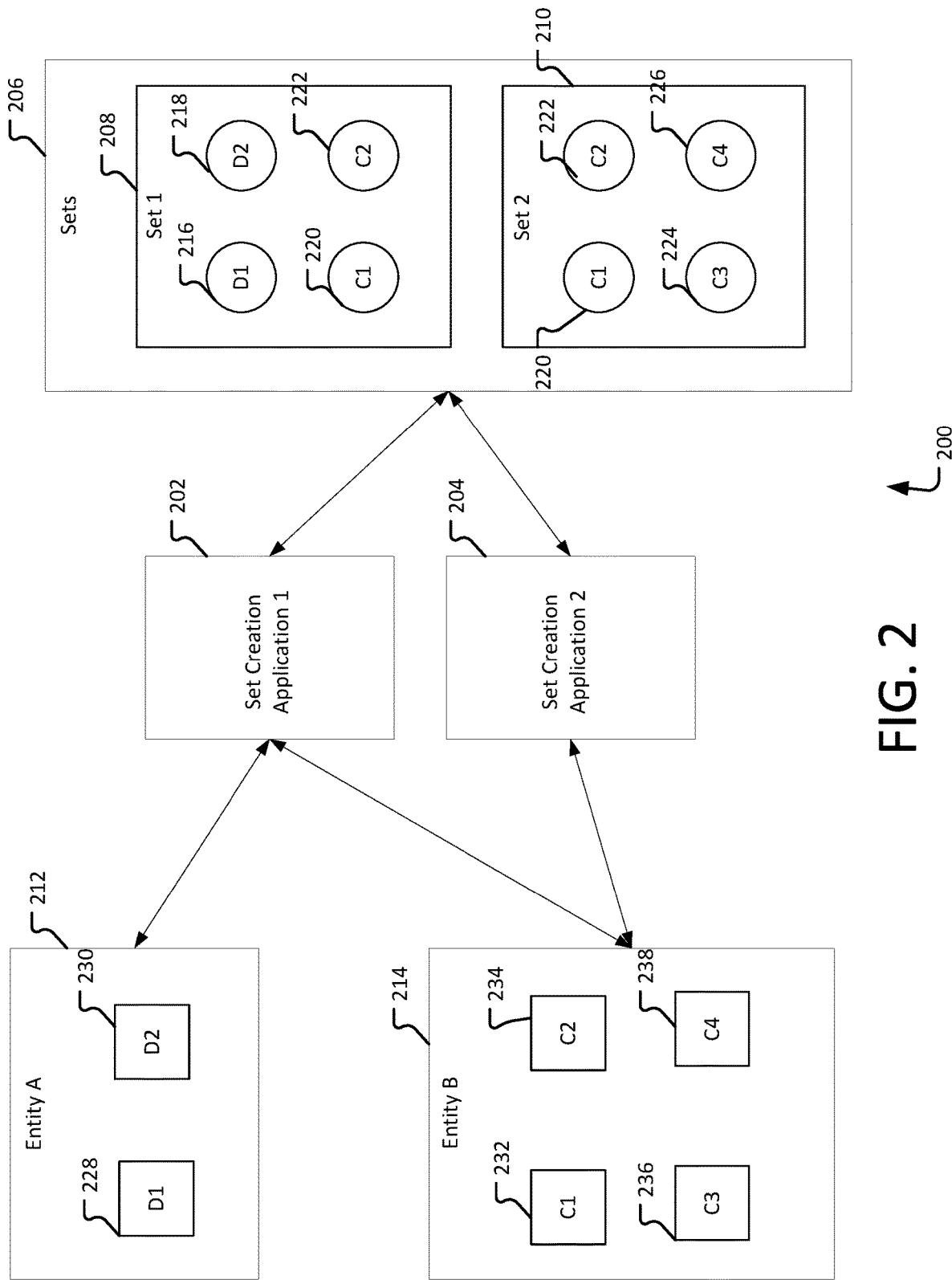
FIG. 2 illustrates an overview of an example system for managing isolated collections of data as described herein.

FIG. 2 illustrates an overview of an example system 200 for managing isolated collections of resource identifiers and corresponding relationships. The isolated collection techniques implemented in system 200 may comprise or be associated with one or more of the task management techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define isolated collections of relationships between resources (e.g., people, files, tasks, mail, documents, calendar events, etc.) and executing queries on those isolated collections. Set creation applications 202 and 204 may further provide for defining and storing rulesets used to infer one or more relationships in the isolated collections, and displaying graphical representations of the isolated collection data. The defined rulesets may be stored in the isolated collection itself, and in some examples is stored as metadata within the isolated collection. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more isolated data collections, such as Sets 208 and 210. In examples, access to the isolated data collections may be determined using one or more permissions sets generated and/or maintained by Set creation applications 202 and 204. The permissions sets may be different across one or more of the isolated data collections. As a result, one or more of the isolated data collections (or functionality associated therewith) may not be accessible from one or more of Set creation applications 202 and 204.

Sets 208 and 210 may respectively comprise isolated collections of asserted and/or inferred resource identifiers and relationships. The relationships in the isolated collections may be defined manually or may be automatically derived using one or more rule sets. The isolated collections may be represented using graphical structures, such as a named graph, that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource but is not itself a resource.

Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation 2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238.

In some aspects, resource providers 212 and 214 (or resources associated therewith) may be accessible by Set creation applications 202 and 204. For example, Set creation applications 202 and 204 may access resource providers 212 and 214 to determine the existence of resources and/or retrieve information associated with the resources (e.g., resource metadata, resource location, resource identifiers, permission sets, authorization data, etc.). In an alternate example, Set creation applications 202 and 204 may not have access to resource providers 212 and 214. Instead, resource providers 212 and 214 may, for example, publish or broadcast resources and/or resource information to one or more devices or storage locations. Set creation applications 202 and 204 may then access the devices or storage locations receiving the resources/resource information to determine the existence of resources. In yet another example, Set creation applications 202 and 204 may receive resources/resource information directly. For instance, a user may use an interface accessible to Set creation applications 202 and 204 to create or upload on or more resources. In such aspects, the retrieved resources/resource information may be used to determine a set of resource identifiers corresponding to one or more of the available resources. The set of resource identifiers may be used to create one or more isolated collections. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authorization and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
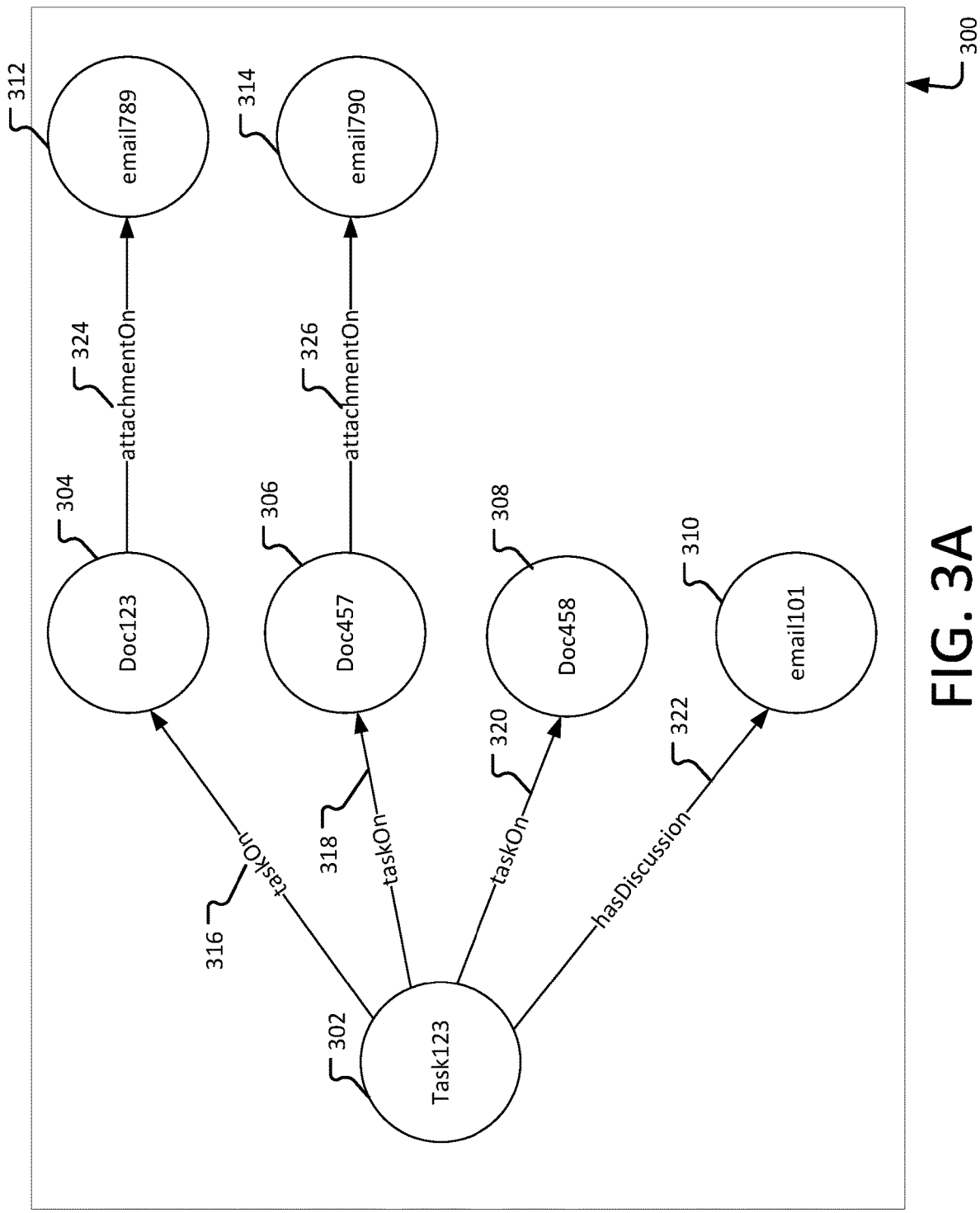
FIGS. 3A-E illustrate an example isolated collection of data as described herein.

FIG. 3A illustrates an example isolated collection 300 of resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, isolated collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a user through a Sets creation application. For instance, a developer may manually add each of the resource identifiers and the relationships between the resource identifiers. As an example, the developer may manually indicate that the "task123" is a task on "Doc123," as represented in the isolated collection 300 by the "taskOn" relationship 316. The resource identifiers and relationships may also be asserted by an external bot or application created by a user. For instance, an add-in may be programmed to monitor activity in a browser or other application to track usage of the application. Based on the usage of the application, the add-in may send additional resources and relationships to be included in the isolated collection 300.

In contrast to the asserted resource identifiers and relationship, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below. Based on this determination, the collection creation utility may assign relationship 324 (e.g., "attachmentOn") to define the association between resource identifier 312 and resource identifier 304. The collection creation utility may utilize a similar approach to assign relationship 326 (e.g., "attachmentOn") to define the association between resource identifier 314 and resource identifier 306.

Isolated collection 300 further depicts that resource identifier 302 is associated with resources identifiers 304, 306 and 308 and resource identifier 310. The collection creation utility may determine that the resource identifier 302 represents a task to be performed on identifiers 304, 306 and 308. Based on this determination, the collection creation utility may assign relationships 316, 318 and 320 (e.g., "taskOn") to define the association between resource identifier 302 and resource identifier 304, 306 and 308. The collection creation utility may further determine that resource identifier 310 represents an email (without an attachment) that comprises a discussion of one or more aspects of resource identifier 302. Based on this determination, the collection creation utility may assign relationship 322 (e.g., "hasDiscussion") to define the association between resource identifier 302 and resource identifier 310.

Figure 3C:
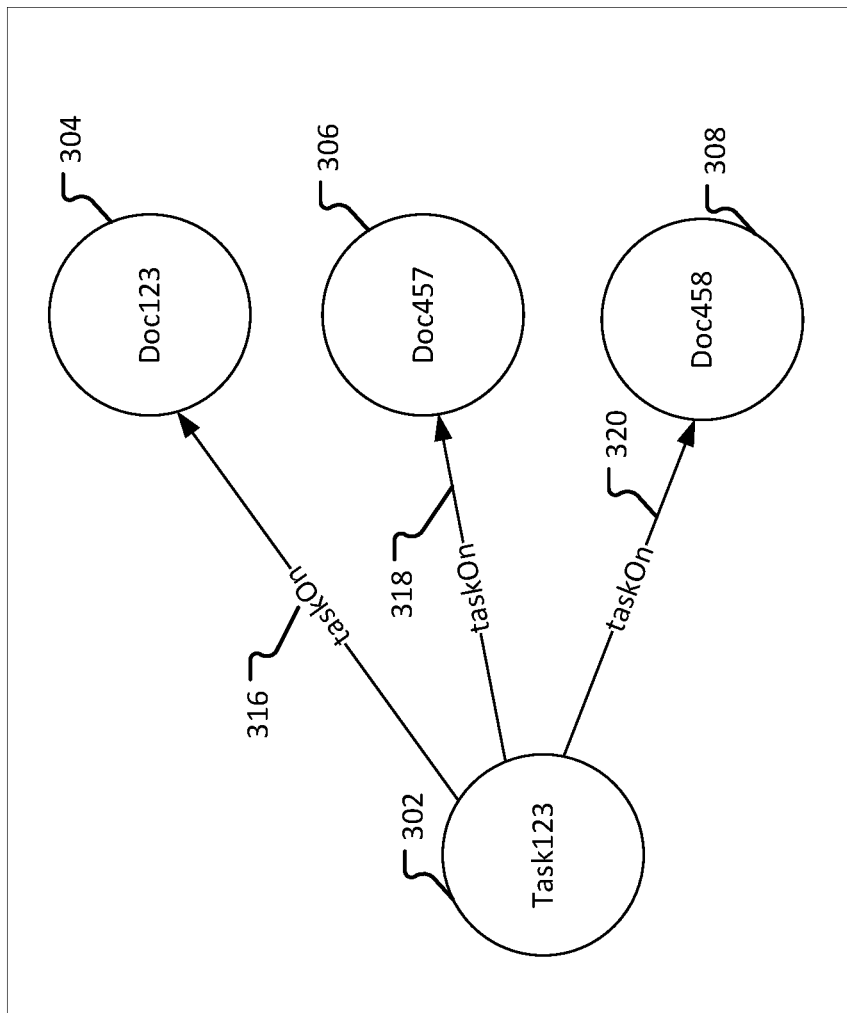
Figure 3B:
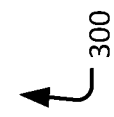
Figure 3D:
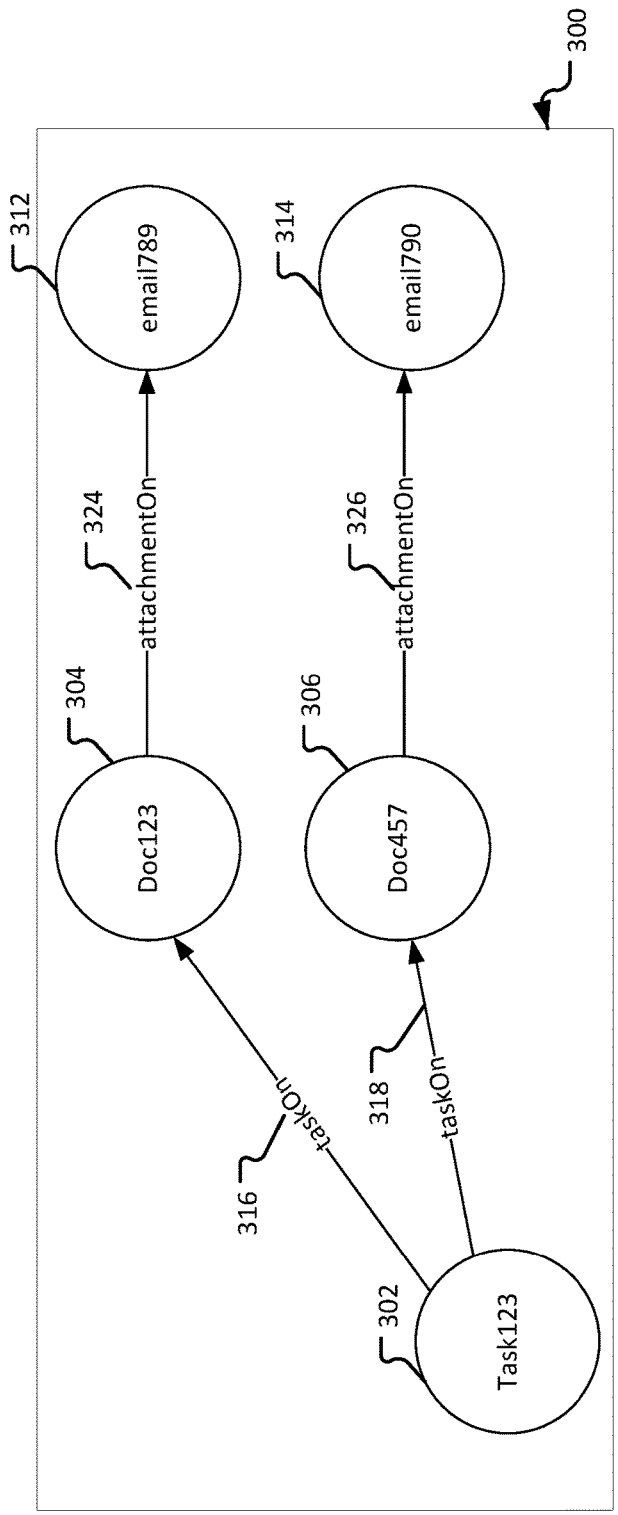
Figure 3E:
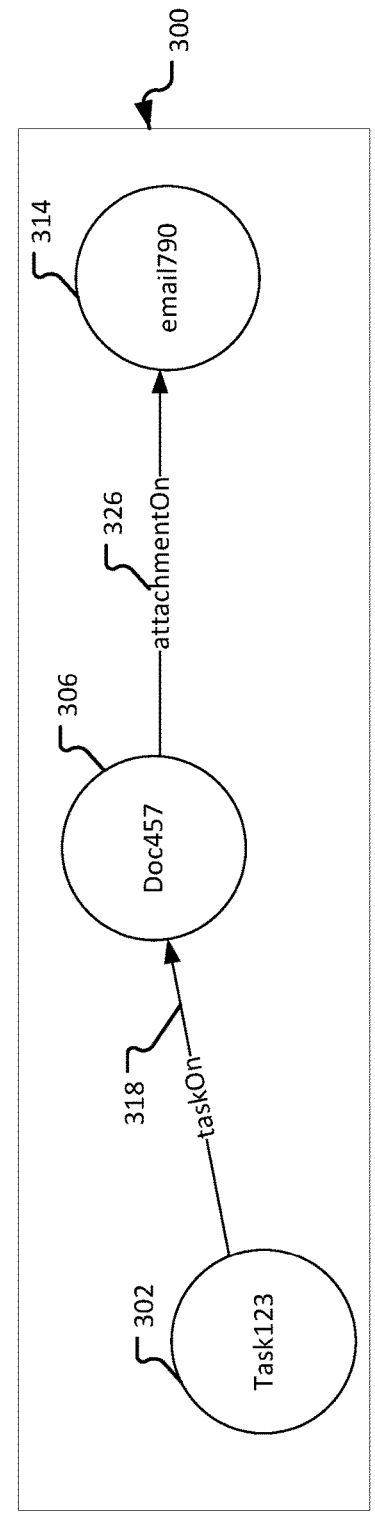

FIGS. 3B-3E illustrate an example query model that may be used to traverse isolated collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as isolated collection 300. For example, the entire isolated collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http://.../collection300/task123' may be executed against isolated collection 300. The query results may comprise resource identifier 302 and be visualized as illustrated. In FIG. 3C, the query has been amended to 'http://.../collection300/task123?$expand=taskOn' and executed against isolated collection 300. The query results may comprise resource identifiers 302, 304, 306 and 308 and relationships 316, 318 and 320, and be visualized as illustrated. In FIG. 3D, the query has been amended to 'http://.../collection300/task123?$expand=taskOn($expand=attachmentOn)' and executed against isolated collection 300. The query results may comprise resource identifiers 302, 304, 306, 308, 312 and 314 and relationships 316, 318, 320, 324 and 326, and be visualized as illustrated. In FIG. 3E, the query has been amended to 'http://.../collection300/task123?($expand=taskOn($expand=attachmentOn) ($filter=Subject eq 'Sets'))' and executed against isolated collection 300. As only resource identifier comprises the subject "Sets," the query results may comprise resource identifiers 302, 306 and 314 and relationships 318 and 326, and be visualized as illustrated.

Figure 4:
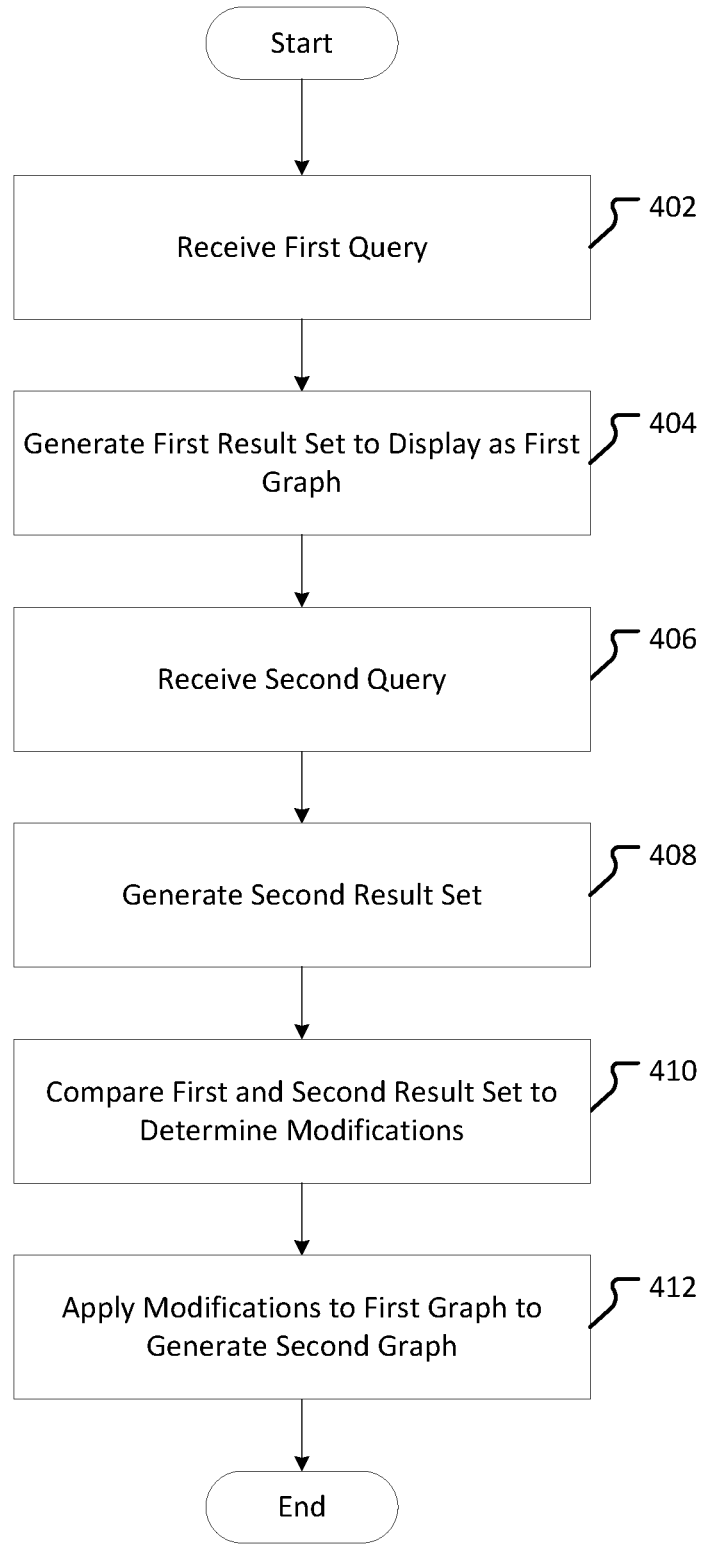
FIG. 4 illustrates an overview of an example system for rendering phantom results using isolated collections of data as described herein.

FIG. 4 illustrates an overview of an example method 400 for rendering phantom results using isolated collections of data as described herein. In aspects, method 400 may be executed by a system such as system 100 of FIG. 1. In examples, method 400 may be executed on a device comprising at least one processor configured to store and execute operations, programs or instructions. However, method 400 is not limited to such examples. In other examples, method 400 may be performed by an application or service for navigating, querying and/or visualizing isolated collections of data. In at least one example, method 400 may be executed (e.g., computer-implemented operations) by one or more components of a distributed network, such as a web service/distributed network service (e.g. cloud service).

Example method 400 begins at operation 402 where a first query is executed against one or more data sources. In aspects, a query may be received by a computing device via one or more interfaces. The query may originate at, and/or be transmitted to the computing device by, a client device, such as client devices 102A-C. The computing device may evaluate the query to determine keywords in the query, a subject of the query, query parameters, or one or more targeted data sources. In at least one example, a plurality of subqueries may be generated as part of the evaluation. For instance, a set of subqueries may be generated for each of the keywords, parameters or data sources identified for the query. The query and/or subqueries may be provided to one or more search utilities and/or data sources accessible to the computing device. As a particular examples, the computing device may provide a query to a search engine, a data management utility, such as Set creation applications 202 and 204, a resource provider, such as Entities 212 and 214, one or more isolated collections of data, such as Sets 208 and 210, and/or other data sources. As another example, the computing device may process one or more portions of a query locally.

Figure 5B:
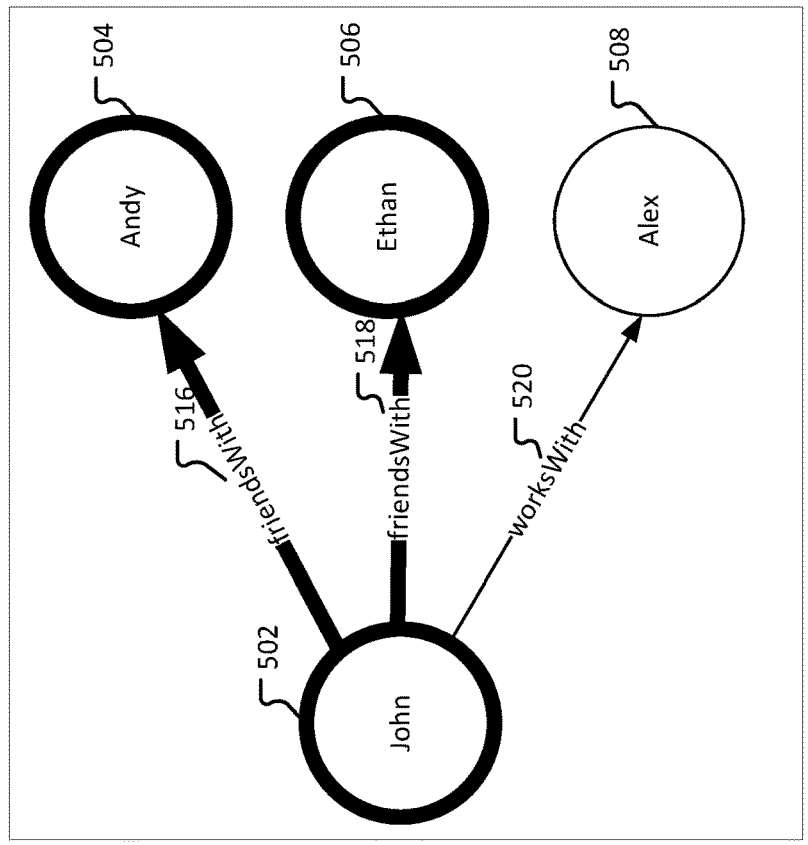
FIGS. 5A-5F illustrate examples of graphical illustrations comprising phantom result as described herein.
Figure 5A:
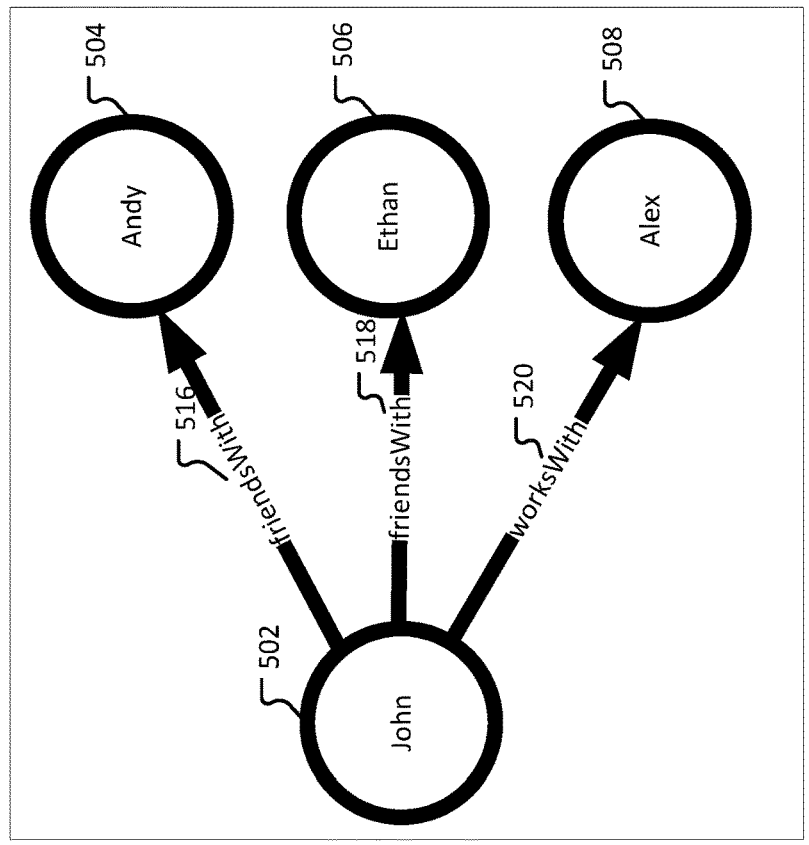

At operation 404, a result set may be generated for a query. In aspects, a result set may be generated by one or more data source(s) receiving the query. The results from each data source may be aggregated and/or organized into a combined result set. The result set may comprise organized lists (e.g., tuples) of data from one or more data sources. For instance, the result set for a query submitted to an isolated collection of data may comprise several 3-tuples of resources and relationships (e.g., resource-relationship-resource or node-edge-node). In aspects, the result set may be used to generate a graphical illustration comprising representations of the elements in the organized lists. Examples of graphical illustrations may include a graph database, a graph, a chart, a diagram, or the like. As a specific example, FIG. 5A depicts a graph database comprising result data for the query 'http://.../collection1/John.' The result data comprises the following three 3-tuples: "John-friendsWith-Andy," "John-friendsWith-Ethan," and "John-worksWith-Alex." As shown, the resources 502, 504, 506 and 508 (e.g., John, Andy, Ethan and Alex) are represented with circles, and the relationships 516, 518 and 520 (e.g., friendsWith, friendsWith and worksWith) are represented with arrows. Although FIG. 5A is described herein using particular resources, relationship, shapes and shape characteristics, those skilled in the art will appreciate other types of resources, relationship, shapes and/or shape characteristics may be utilized by the aspects of this disclosure. In some aspects, result set data and/or graphical illustration may be stored on, for example, a client device originating the query, the computing device receiving the query, or some combination thereof.

At operation 406, a second query may be executed against one or more data sources. In aspects, the query executed at operation 402 may be modified, refined or reformulated to generate a second query. Alternately, a second query that is separate from the first query may be generated. As an example, the query that generated the three 3-tuples in FIG. 5A may be modified to exclude the 'worksWith' relationships. The second query may be evaluated by the computing device (or an evaluation component associated therewith) and provided to a data management utility, resource provider, or data source, as described above. At operation 408, a second result set may be generated for the second query. In aspects, results may be generated for the one or more data source(s) receiving the second query. The results from each data source may be aggregated and/or organized into a second combined result set. The second result set may be used to generate a second graphical illustration comprising representations of the elements in the organized lists of the second result set. The second result set data and/or second graphical illustration may be stored with the first result set data and graphical illustration or on a client device originating the query, the computing device receiving the query, or some combination thereof.

At operation 410, the first result set and second result set may be compared. In aspects, a comparison utility may be used to compare the first result set to the second result set. The comparison utility may be installed on, or accessible to, one or more of the client device originating the query and the computing device receiving the query. The comparison tool may use machine learning techniques, rule sets, regular expressions, or the like to evaluate the two result sets. In some examples, comparing the two result sets may include identifying the lists of tuples in each result set and generating a comparison list of tuples that are missing from, more or less relevant to, or modified in, the first and/or second result sets. The comparison list may be used to generate or modify a second graphical illustration. In such examples, generating the second graphical illustration may comprise duplicating the first graphical illustration and applying the differences in the comparison list to the first graphical illustration; thereby, generating the second graphical illustration. In other examples, the first and second graphical illustrations generated at operations 404 and 408 may be compared. For instance, the first and second graphical illustrations may be parsed or otherwise analyzed to determine the constituent elements of each graphical illustration. The location in the graphical illustrations of the respective determined constituent elements may also be determined. The differences in the determined information may be stored in, for example a comparison list.

At operation 412, modification may be applied to a graphical illustration. In aspects, a comparison list may be used to apply modifications to the first graphical illustration. Applying modifications to the first graphical illustration may include the use of one or more rule sets and/or weighting techniques. Such rules and techniques may include, for example, resource-relationship rules and/or tuple element rules. As an example, resource-relationship rules may specify that a tuple (e.g., resource-relationship-resource) included in a result set or comparison list is to be assigned a specific weight based on the addition or removal of the tuple from previous result sets. As an example, resource-relationship rules may specify that a tuple included in a result set or comparison list is to be associated with a weight or score based on the increased or decreased relevance of the tuple with respect to previous result sets. As yet another example, tuple element rules may specify that the individual resources or relationships included in a result set or comparison list are to be individually assigned specific weights based on the addition or removal of one or more of the tuple elements from previous result sets. In some aspects, the assigned (or otherwise associated) weights/scores may be represented in the associated graphical illustration using, for example, colors, line weights, line styles, etc. As an example, FIG. 5A depicts a graph database comprising result data represented by increased line weights (giving the appearance of bolded circles and arrows). The increased line weights may correspond to the resource-relationship weight assigned to tuples in a result set. For instance, each of the tuples in the result set of FIG. 5A may be assigned a weight of, for example, 3.0 (e.g., John-friendsWith-Andy=3.0; John-friendsWith-Ethan=3.0; John-worksWith-Alex=3.0). FIG. 5B, in contrast, depicts a graph database for which the query used in FIG. 5A (e.g., 'http://.../collection1/John') was amended to exclude the 'worksWith' relationships. The result data for the query of FIG. 5B may only comprise the tuples "John-friendsWith-Andy" and "John-friendsWith-Ethan." Accordingly, a comparison list of the result data of FIGS. 5A and 5B may indicate the omission of the "John-worksWith-Alex" tuple. As a result, the weight of the omitted tuple (e.g., John-worksWith-Alex) may be decremented and/or the tuple may be assigned a decremented weight. The comparison list (and/or the weights/scores of the tuples associated therewith) may then be applied to the graph database of Figure A to generate the graph database of FIG. 5B.

In aspects, one or more graphical illustrations may be stored by a computing device. In examples, graphical illustrations and data associated therewith may be stored by the computing device and/or transmitted to, and stored by, one or more client devices. In such examples, the storing devices may be configured to store multiple iterations of the graphical illustrations, corresponding queries, and/or corresponding result sets. The storing devices may be further configured to provide an interface for navigating and manipulating the multiple iterations. As a particular example, the storing devices may comprise a slider utility. The slider utility may enable users to quickly traverse the multiple iterations to visualize and evaluate query results over time. As another example, the storing devices may comprise a reporting utility. The reporting utility may enable users to analyze query patterns, evaluate system resource usage, schedule maintenance periods, generate reports, etc. As yet another example, the storing devices may comprise a graph manipulation utility. The graph manipulation utility may enable users to modify and/or re-execute previous queries, modify query results, and modify one or more graph elements.

FIG. 6 illustrates an overview of an example method 600 for applying modifications to rendering phantom results using isolated collections of data as described herein. Example method 600 begins at operation 602 where organized lists (e.g., tuples) in a first and second result set are compared. In aspects, a computing device (or a comparison component associated therewith) may access and compare the tuples in a first and second result set. In examples, comparing the tuples of the two result sets may comprise applying the tuples to a scoring algorithm or scoring model. The scoring algorithm/model may be operable to iterate through the tuples of the first result set and/or the second result set. For example, for each tuple in the first result set, the scoring algorithm/model may perform (or cause a separate application or service to perform) an operation. At decision operation 604, a determination may be made as to whether a tuple from a first result set is in a second result set. In aspects, the scoring algorithm/model may search a second result set for a tuple in a first result set. If it is determined that the currently-evaluated tuple from the first result set is present in the second result set, flow may proceed to operation 606. If it is determined that the currently-evaluated tuple from the first result set is not present in the second result set, flow may proceed to operation 610.

Figure 5C:
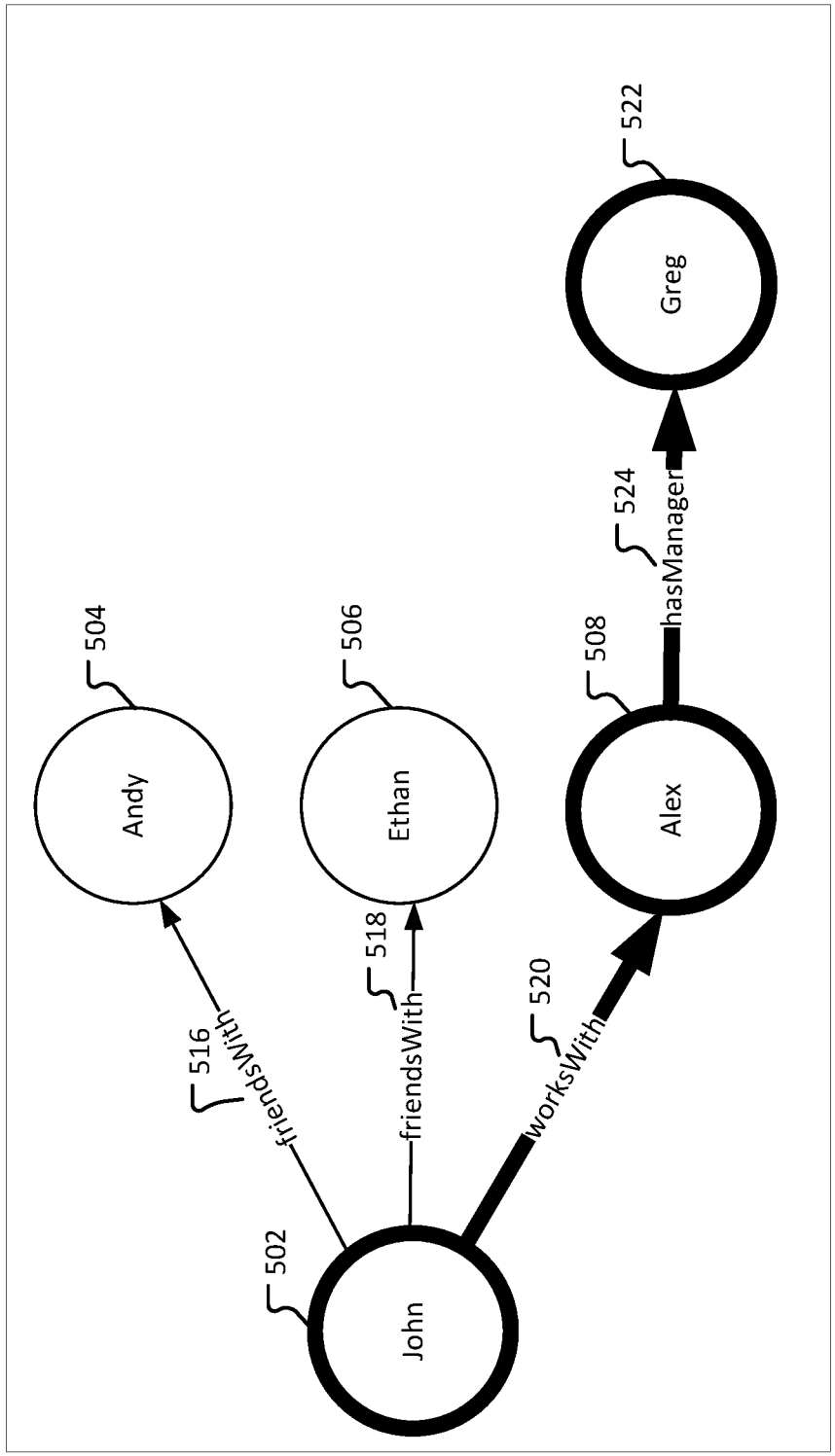

At operation 606, a weight may be assigned to the currently-evaluated tuple. In aspects, the computing device may maintain or be subject to one or more resource-relationship rules. For example, a resource-relationship rule may specify that tuples identified as appearing in a first result set and a subsequent second result set are assigned a specific weight (such as 3.0) in the second result set. In such an example, the largest cumulative weighting value may be set to a predefined threshold, such as 3.0. As such, tuples appearing in the result sets of multiple consecutive queries may be (re)assigned a weight of 3.0. Alternately, no weighting value threshold may be defined or definable. As a result, the weights of the tuples appearing in both sets may be added or otherwise combined such that the a weight of 6.0 is assigned to the tuples in the second result set (e.g., first result set weight (3.0)+second result set weight (3.0)=new second result set weight (6.0)). As another example, a resource-relationship rule may provide for determining the relevance of (or a change in the relevance of) a tuple appearing in a first result set and a subsequent second result set. For instance, FIG. 5C depicts a graph database for which the query used in FIG. 5A (e.g., 'http://.../collection1/John') was amended to include the 'hasManager' relationship (e.g., 'http://.../collection1/John?$expand=hasManager'). In FIG. 5C, the result set for the amended query comprises the resources and relationships of FIG. 5A, as well as resource 522 (e.g., Greg) and relationship 524 (e.g., hasManager). Resource 522 and relationship 524 correspond to the tuple "Alex-hasManager-Greg." As shown in FIG. 5C, resources 504 and 506 are not associated with relationship 524. As a result, a determination may be made (using, for example, the scoring algorithm/model described above) that the resources 504 and 506 are not as relevant to the amended query as resources 508 and 522. In such examples, relevance of a tuple may represented by a weight/score and may be correspond to the degree of attenuation (with respect to a second query) between tuples appearing in a first result set and a second result set. As a specific example, tuples corresponding to resources 504 and 506 may be identified as being one "hop" (e.g., degree of separation) away from the tuple corresponding to the applied 'hasManager' filter, and, thus, less relevant to the amended query. As a result, the weights of tuples corresponding to resources 504 and 506 may be decremented or associated with a decremented value. In such as example, a resource-relationship rule may govern the application of weights/scores for increasing and decreasing tuple attenuation in results sets. The decremented tuple weights/values may then be represented on a graph by, for example, lightened colors, increased transparency (e.g., greying out or "phantoming"), decreased line weights, altered line styles, decreased shape sizes, etc. as shown in FIG. 5C.

At operation 608, a tuple with an assigned weight may be displayed on a graphical illustration. In aspects, the resource-relationship rule (or an associated rule) may further specify how an assigned weight is to be represented in a graphical illustration. For example, the rule may specify that tuples present in a first and second result set (or within a specified weight range) will be represented in a second graphical illustration (e.g., a graphical illustration corresponding to the second result set) in the same manner (e.g., style, color, transparency, shape, size, etc.) as the tuples were presented in the first graphical illustration (e.g., a graphical illustration corresponding to the first result set). As a particular example, FIG. 5B illustrates how the tuples "John-friendsWith-Andy" and "John-friendsWith-Ethan" (both tuples present in the result sets of FIGS. 5A and 5B) are represented in a graph database corresponding to the result set of FIG. 5B. In another example, the rule may specify that tuples present in a first and second result set (or within a specified weight range) will be represented in a second graphical illustration by an enhanced graphical property (e.g., the representation may be enlarged, bolded, made less transparent, etc.). For instance, a tuple appearing in three consecutive result sets (or consecutively having a weight within a specific weight range) may be represented as progressively bolder (or darker, etc.) in the graphs corresponding to the second and third result sets. In yet another example, the rule may specify that tuples determined to be less (or more) relevant in a first result set than a second result set will be represented in a second graphical illustration by a diminished (or enhanced) graphical property.

At operation 610, a weight may be assigned to the currently-evaluated tuple. In aspects, a resource-relationship rule may specify that tuples that are removed from, or modified in, subsequent result sets are also assigned (or subject to) a decremented weight value (such as −1.0) in the second result set. The assignment and/or the application of a negative weight to a tuple may be represented in the associated graphical illustration by, for example, lightened colors, increased transparency (e.g., greying out or "phantoming"), decreased line weights, altered line styles, decreased shape sizes, etc. As an example, FIG. 5B depicts a graph database for which the query used in FIG. 5A (e.g., 'http://.../collection1/John') was amended to exclude the 'worksWith' relationships. Thus, the result data for the query of FIG. 5B may only comprise the tuples "John-friendsWith-Andy" and "John-friendsWith-Ethan." As a result, a scoring model/algorithm may assign a weight of 3.0 to the two tuples in the result set of FIG. 5B. The scoring model/algorithm may additionally determine that the tuple "John-worksWith-Alex" appears in the first result set, but not in the second result set. As a result, a weight of −1.0 may be added or applied to the weight of this tuple in the first set (e.g., 3.0) to generate a second result set weight of 2.0 (e.g., first result set weight (3.0)+second result set weight (−1.0)=new second result set weight (2.0)). At operation 612, a tuple with a decremented weight may be displayed on a graphical illustration. For example, as shown in FIG. 5B, the decreased weight of the "John-worksWith-Alex" tuple (e.g., the phantom result) may be represented by a decreased line weight for the "worksWith" relationship 520 and "Alex" resource 508.

Figure 5E:
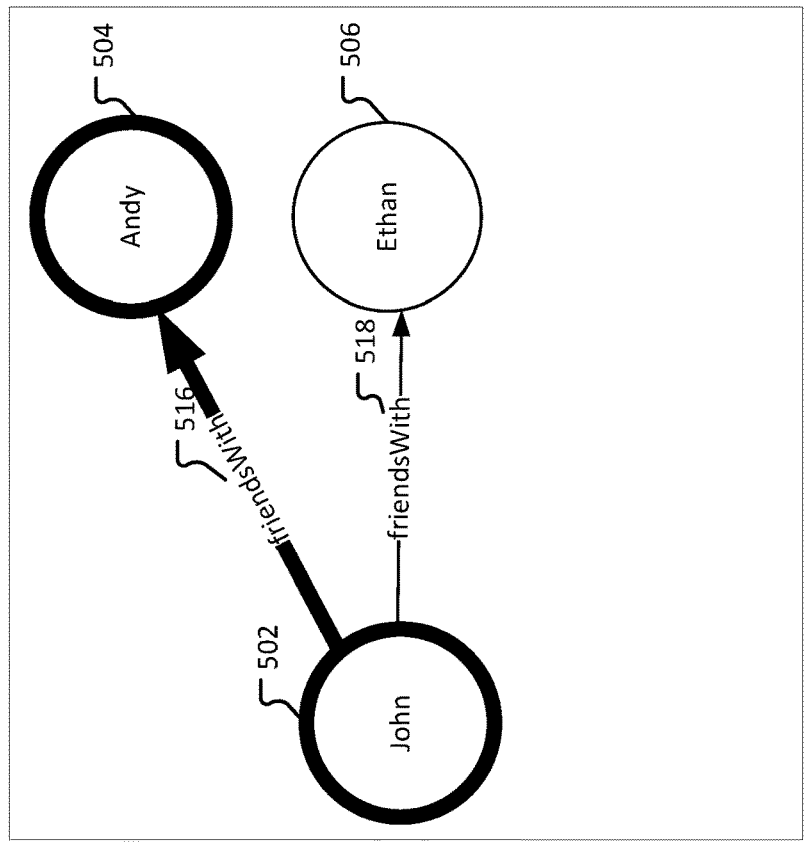
Figure 5D:
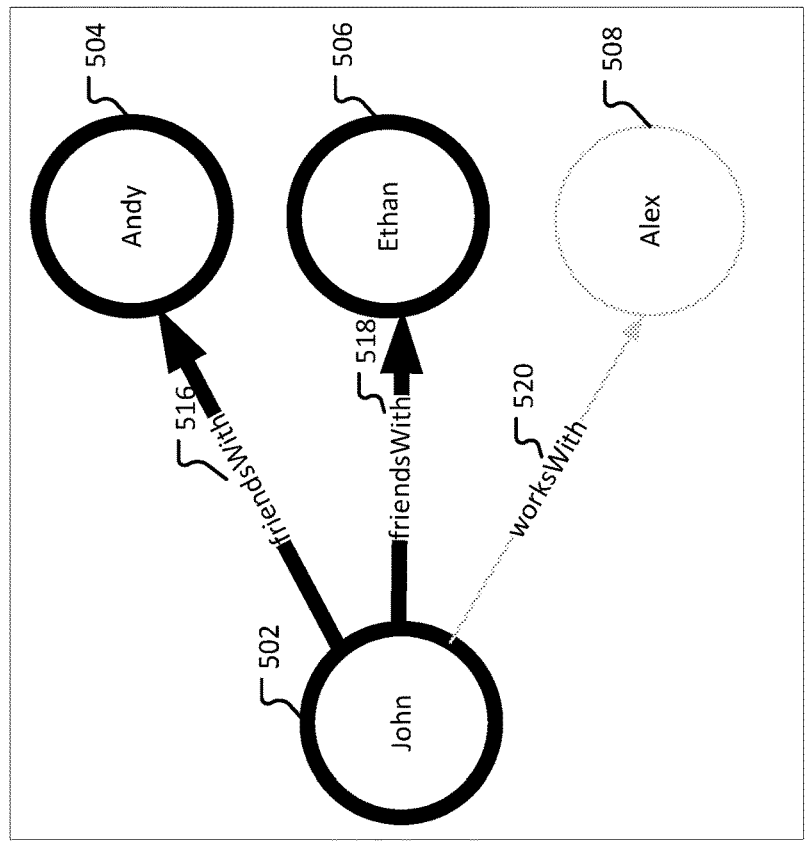

In other aspects, a resource-relationship rule may specify a criteria for removing a tuple (or one or more elements thereof) from a graphical illustration. Such criteria may include a weighting value threshold, a transparency value threshold, the number of queries since the first query (e.g., the initial query in the current query session), the attenuation of results values from a determined user intent, etc. As an example, the weighting value threshold for removing tuples from a graph may be set to a value of 0.0. In such an example, a tuple having a weight of 0.0 or below may be assigned a maximum transparency value (thereby, hiding the representation of the tuple from view). The cumulative tuple weight and/or the position of the representation of the tuple in the graph, may be maintained over several iterations of queries. Alternately, a tuple having a weight of 0.0 or below may cause the tuple and an associated weight to be removed from the result set, such that the corresponding graph is rendered without a representation of the tuple. In some aspects, criteria for removing a tuple from a graphical illustration may provide for decreasing and/or increasing the transparency of a tuple multiple times over multiple iterations of a graph database (e.g., causing the representation of the tuple to fade in and out over a succession of queries). As an example, FIG. 5D depicts a graph database for which the query used in FIG. 5B was re-executed, or amended such that the result set of FIG. 5D mirrored the result set in FIG. 5B (e.g., the result set comprises the tuples "John-friendsWith-Andy" and "John-friendsWith-Ethan"). As with FIG. 5B, the scoring model/algorithm may apply a weight of 3.0 to the two tuples appearing in the result sets of FIGS. 5B and 5D, and apply a weight of −1.0 to the tuples in the result set FIG. 5B that do not appear in the result set of FIG. 5D (e.g., "John-worksWith-Alex"). The resulting resource-relationship weights (e.g., John-friendsWith-Andy=3.0; John-friendsWith-Ethan=3.0; John-worksWith-Alex=2.0+−1.0=1.0) may then be represented on the graphical illustration. At operation 614, a tuple with a further decremented weight may be displayed on a graphical illustration. For example, as shown in FIG. 5D, the further decreased weight of the "John-worksWith-Alex" tuple (e.g., the phantom result) may be represented by increasing the transparency of (e.g., fading) the "worksWith" relationship 520 and "Alex" resource 508.

In yet other aspects, a resource-relationship rule may specify criteria for rapidly decrementing and/or removing a tuple from a graphical illustration. Such criteria may include factors such as the number of results impacted by a query, the subject of a query, a filter element, or the like. For instance, a resource-relationship weighting rule may assign a weight of −1.0 for resources that are excluded from a result set as a result of a subsequent query, whereas a different resource-relationship weighting rule may assign a weight of −3.0 for relationships that are excluded from a result set as a result of a subsequent query. As a particular example, FIG. 5E depicts a graph database for which the query used in FIG. 5A was amended to exclude the 'worksWith' relationships and resources labeled "Ethan." The result data, therefore, only includes the "John-friendsWith-Andy" tuple. As a result, the scoring model/algorithm may apply a weight of 3.0 to the "John-friendsWith-Andy" tuple, a weight of −1.0 to the "John-friendsWith-Ethan" tuple, and a weight of −3.0 to the "John-worksWith-Alex" tuple. The resulting resource-relationship weights (e.g., John-friendsWith-Andy=3.0; John-friendsWith-Ethan=3.0+−1.0=2.0; John-worksWith-Alex=3.0+−3.0=0.0) may then be represented on the graphical illustration. At operation 612, a tuple with a rapidly decremented weight may be displayed on a graphical illustration. For example, as shown in FIG. 5E, the decreased weight (e.g., 3.0 to 2.0) of the "John-friendsWith-Ethan" tuple (e.g., the phantom result) may be represented by greying (e.g., fading) the "friendsWith" relationship 518 and "Ethan" resource 508, and the decreased weight (e.g., 3.0 to 0.0) of the "John-worksWith-Alex" may be represented by removing the "worksWith" relationship 520 and "Alex" resource 508.

Figure 5F:
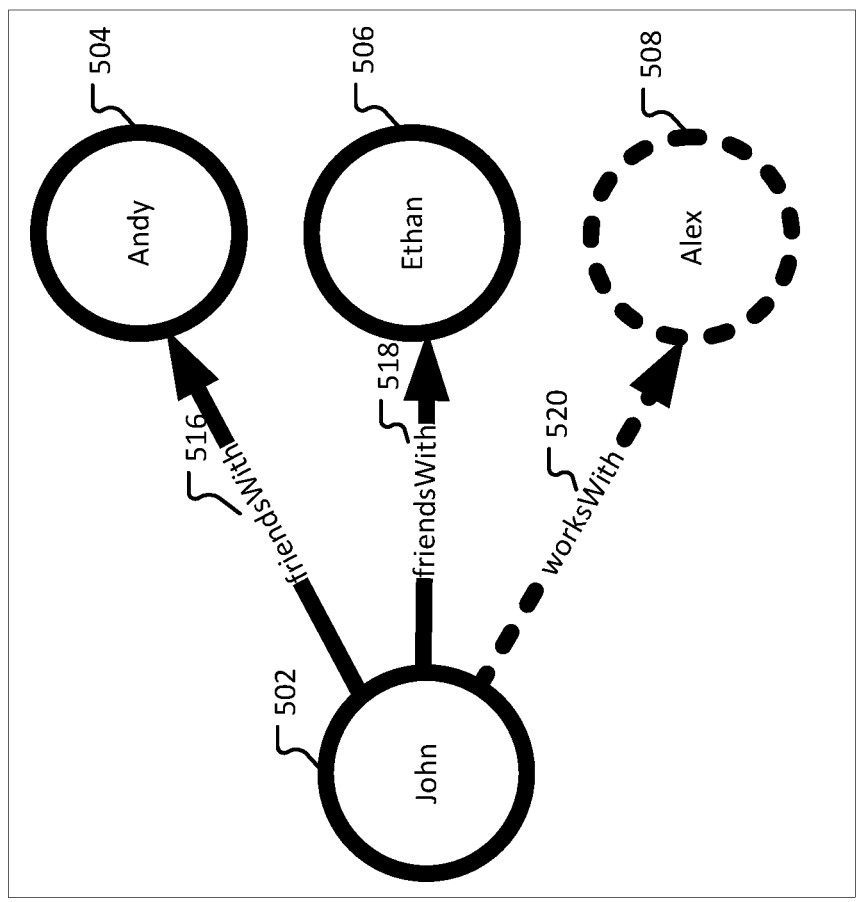

In aspects, a resource-relationship rule may additionally specify the effects used to represent the addition or reappearance of resources and/or relationships to a graphical illustration. For instance, a resource-relationship presentation rule may specify that resources/relationships that are newly present in a result set and not presently represented in a corresponding graphical illustration are to be represented using dashed lines. The dashed lines may be accompanied by increased line weights, as described above with respect to the FIG. 5A. As an example, FIG. 5F depicts a graph database for which the query used in FIG. 5E was amended to the query used in FIG. 5A (e.g., 'http://.../collection1/John') exclude the 'worksWith' relationships and resources labeled "Ethan." The result data, therefore, includes the tuples "John-friendsWith-Andy," "John-friendsWith-Ethan," and "John-worksWith-Alex." The scoring model/algorithm may apply a weight of 3.0 to each of these tuples. The resulting resource-relationship weights may then be represented on the graphical illustration. For example, as shown in FIG. 5F, the increased weight (e.g., 2.0 to 3.0) of the "John-friendsWith-Ethan" tuple may be represented by emboldening (e.g., darkening) the "friendsWith" relationship 518 and "Ethan" resource 506, and the reappearance/increased weight (e.g., 0.0 to 3.0) of the "John-worksWith-Alex" may be represented by generating a dashed "worksWith" relationship 520 and "Alex" resource 508. In such an example, the resource-relationship rules may further specify criteria for converting dashed line representations into solid line representations. For instance, a rule may specify that a resource/relationship newly present in a result set (and therefore represented as a dashed line) is to be represented by a solid line if the resource/relationship is also present in the subsequent result set.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
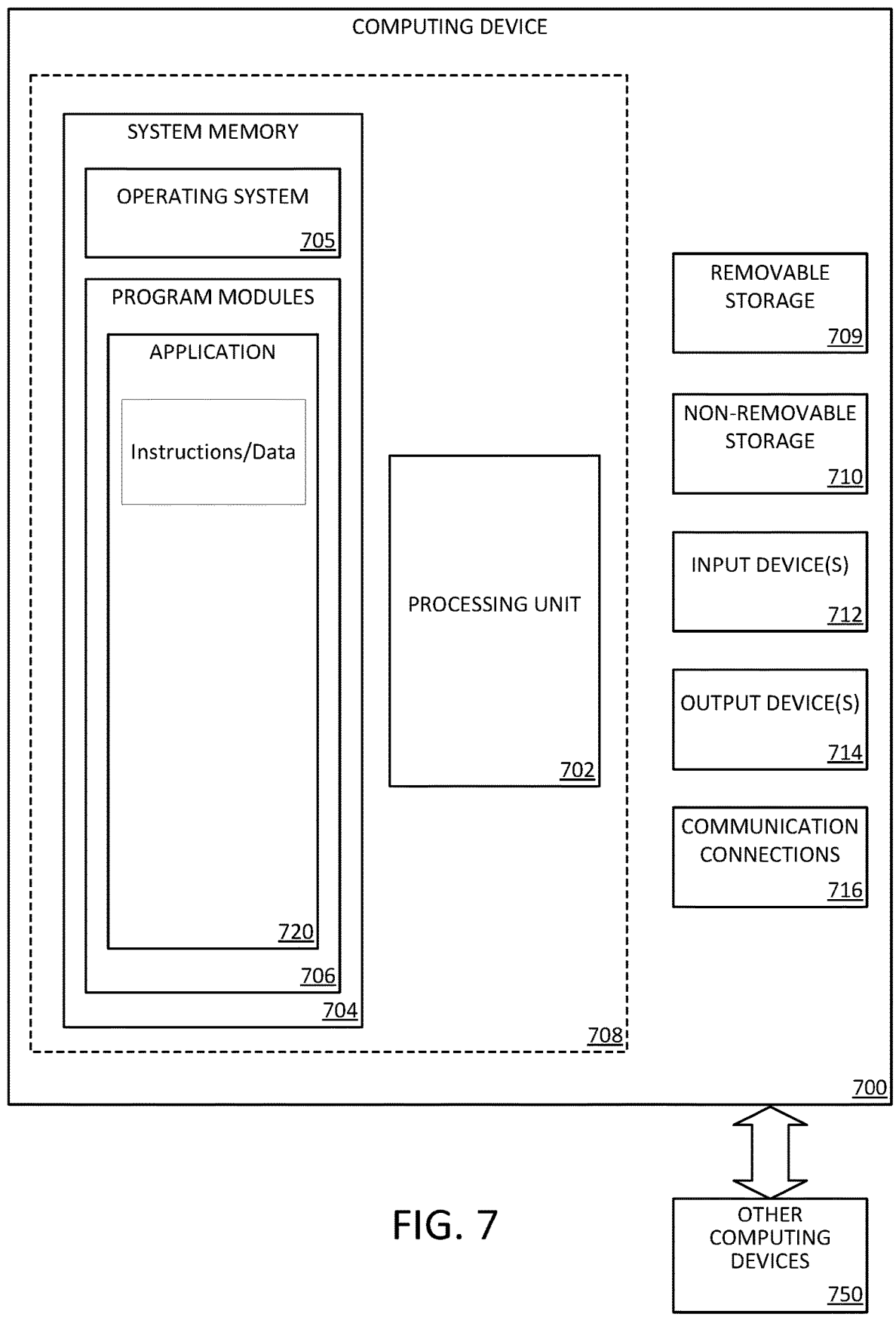
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including the client computing devices 102A-C and the server computing devices 106A-C. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software application 720, such as one or more components supported by the systems described herein. As an example, system memory 704 may store isolated collection data (e.g., resource identifiers, resource metadata, relationship information, asserted/inferred relationships, graphical mapping information, query data, rule sets, such as, for example, inference rules, authorization information, authentication information, etc.) and instructions for managing and presenting graph queries, result data and graphical illustrations associated with the isolated collection data. The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
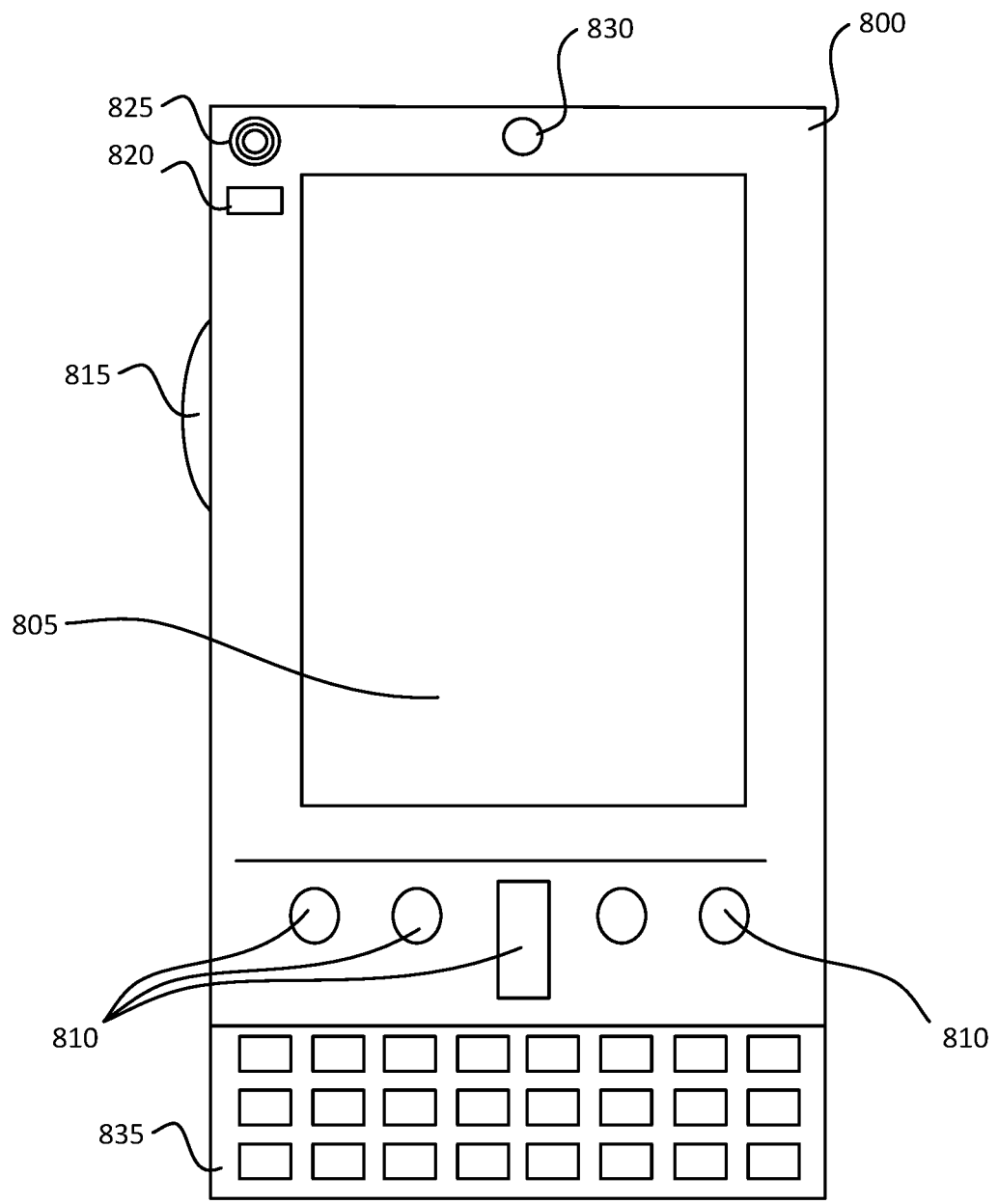
FIGS. 8A and 8B are simplified block diagrams of a mobile computing device with which aspects of the present disclosure may be practiced.
Figure 8B:
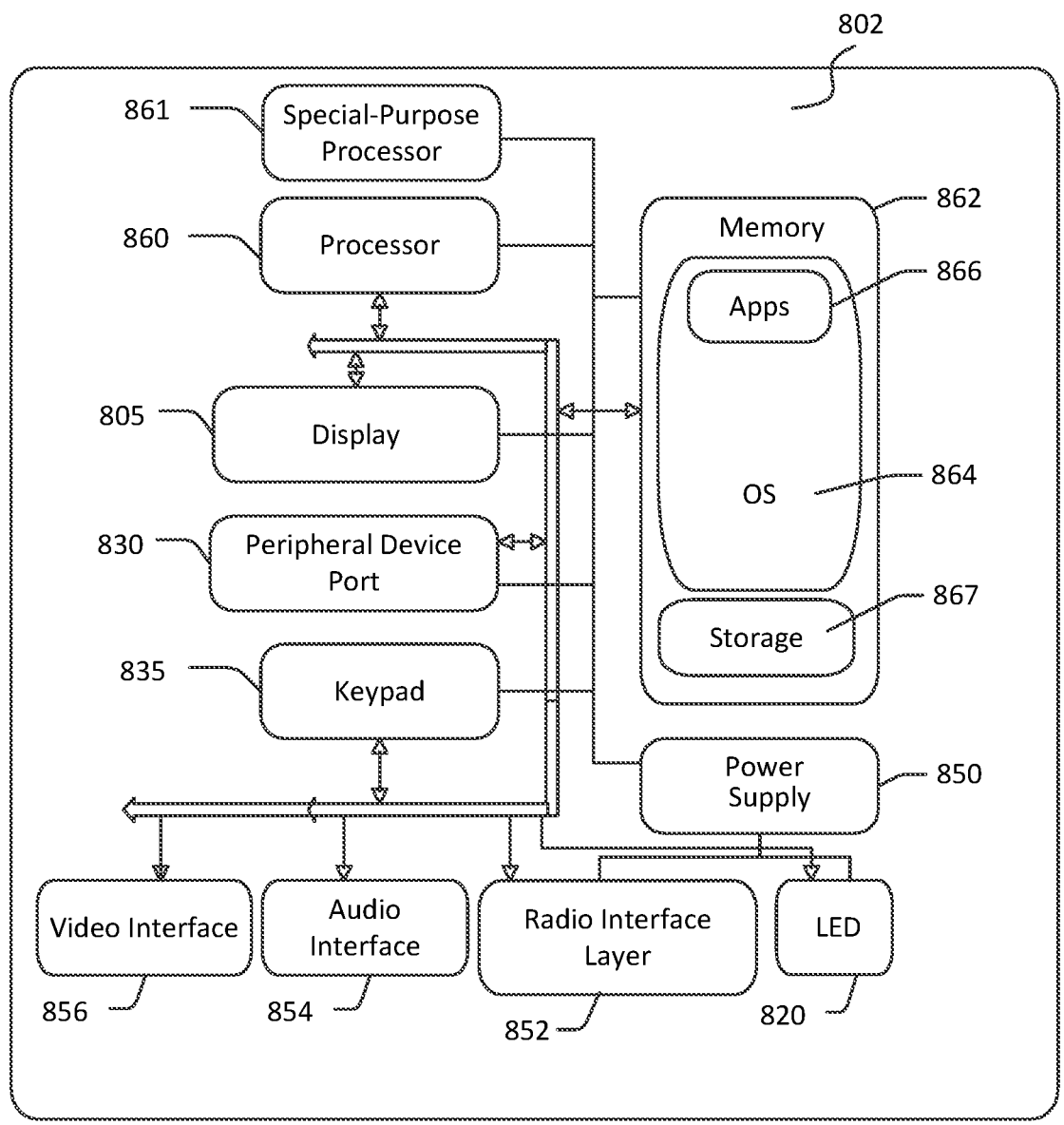

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., search engine, isolated collection engine, result set comparison module, weighting/scoring module, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor(s) (e.g., processor 860 and/or special-purpose processor 861) and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
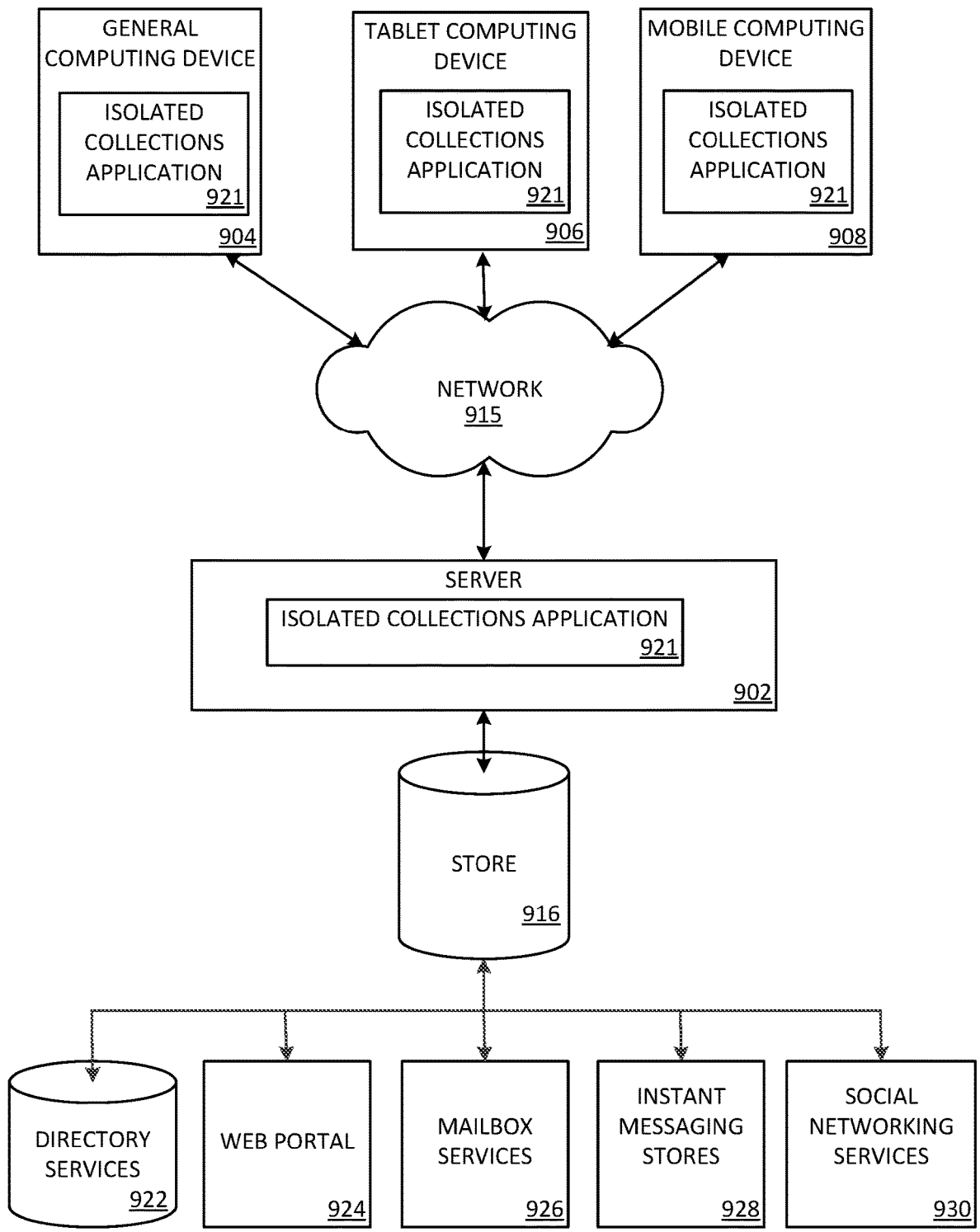
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. An task management application 921 may be employed by a client that communicates with server device 902, and/or the isolated collections application 920 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
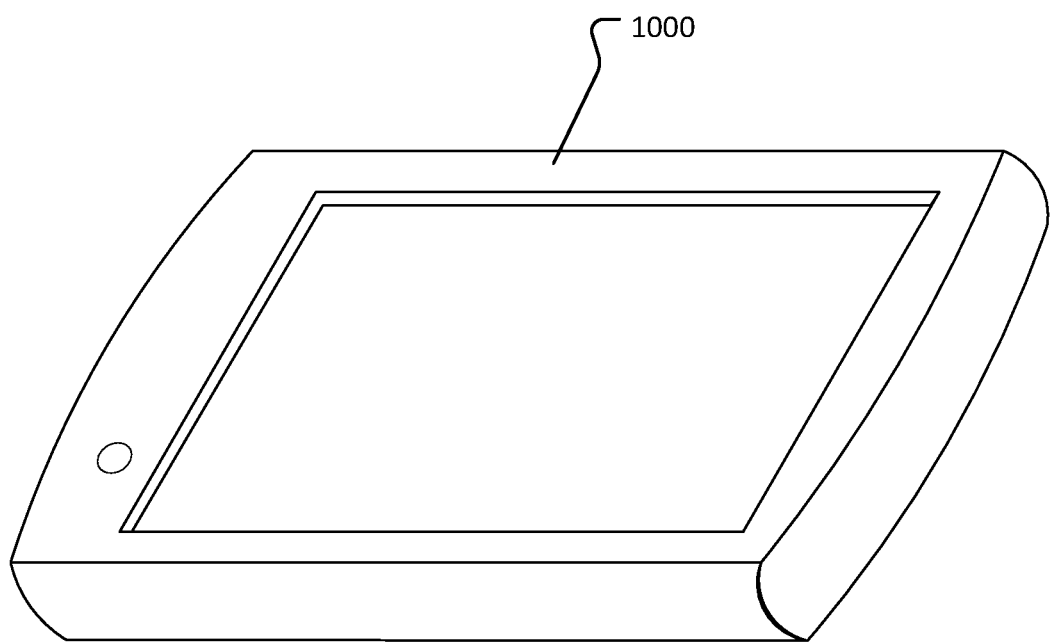
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure provide a system comprising: at least one processor; and memory coupled to the at least one processor, the memory comprising computer executable instructions that, when executed by the at least one processor, performs a method for rendering phantom results, the method comprising: receiving a first query for data associated with one or more isolated collections; generating a first result set for the first query, wherein the first result set comprises a set of information; using the first result set to generate a first graph, wherein the first graph comprises a visual representation of the set of information; receiving a second query associated with the one or more isolated collections; generating a second result set for the second query; comparing the second result set to the first result set to determine whether the second result set comprises the set of information; and when it is determined that the set of information is absent from the second result, generating a second graph comprising the visual representation, wherein the visual representation is modified to indicate the absence of the set of information, wherein the modification comprises increasing transparency of the visual representation. In some examples, the set of information corresponds to one or more tuples, wherein the one or more tuples comprise at least one of a resource and a relationship in the one or more isolated collections. In some examples, the first graph is a first graph database displaying the set of information using a first level of transparency, and the second graph is a second graph database displaying the set of information using a second level of transparency. In some examples, the method further comprises after generating the first result set, evaluating the first result set to identify the set of information; and assigning one or more weights to the set of information, wherein the one or more weights represent the presence of the set of information in the first result set. In some examples, generating the second result comprises: determining whether the second result set comprises the information set; and associating one or more weights with the determination. In some examples, comparing the first result set to the second result set comprises using the one or more weights associated with determining whether the second result set comprises the information set to modify the one or more weights assigned to the first information set. In some examples, the second graph is generated using the modified one or more weights assigned to the first information set. In some examples, modifying the visual representation comprises reducing at least one property of the visual representation selected from the group consisting of color, size, line weight and line style.

Aspects of the present disclosure further provide a method for rendering phantom results, the method comprising: receiving a first query for data associated with one or more isolated collections; generating a first result set for the first query, wherein the first result set comprises: a first set of information comprising a first resource, a second resource, and a first relationship, wherein the first relationship describes a first association between the first resource and the second resource; and a second set of information comprising a third resource, a fourth resource, and a second relationship, wherein the second relationship describes a second association between the third resource and the fourth resource; using the first result set to generate a first graph, wherein the first graph comprises a visual representation of the first set of information and the second set of information; receiving a second query associated with the one or more isolated collections; generating a second result set for the second query, wherein the second result set comprises the first set of information; comparing the second result set to the first result set; determining the second set of information is absent from the second result set; and based on the determination, modifying the visual representation of the second set of information to indicate the absence, wherein the modification comprises increasing a transparency of the visual representation of the second set of information. In some examples, the method further comprises: receiving a third query associated with the one or more isolated collections; generating a third result set for the third query, wherein the third result set comprises the first set of information; comparing the third result set to the second result set; determining the second set of information is absent from the third result set; and based on the determination, modifying the visual representation of the second set of information to indicate the absence, wherein the modification comprises further increasing the transparency of the visual representation of the second set of information. In some examples, the method further comprises: receiving a third query associated with the one or more isolated collections; generating a third result set for the third query, wherein the third result set comprises the second set of information; comparing the third result set to the second result set; determining the second set of information is present in the third result set; and based on the determination, modifying the visual representation of the second set of information to indicate the presence, wherein the modification comprises decreasing the transparency of the visual representation of the second set of information. In some examples, the method further comprises: receiving a third query associated with the one or more isolated collections; generating a third result set for the third query, wherein the third result set comprises a third set of information comprising a fifth resource, a sixth resource, and a third relationship, wherein the third relationship describes a third association between the fifth resource and the sixth resource; comparing the third result set to the second result set; determining the third set of information is absent from the second result set; and based on the determination, adding a visual representation of the third set of information to the first graph such that the first graph comprises the visual representation of the first set of information, the visual representation of the second set of information having increased transparency, and the visual representation of the third set of information. In some examples, increasing the transparency of the visual representation of the second set of information includes setting the transparency to a value causing the visual representation of the second set of information to become fully transparent. In such example, the method may further comprise: receiving a third query associated with the one or more isolated collections; generating a third result set for the third query, wherein the third result set comprises at least the second set of information; comparing the third result set to the second result set; determining the second set of information is present in the third result set; and based on the determination, modifying the visual representation of the second set of information to indicate the presence of the second set of information, wherein the modification comprises decreasing the transparency of the visual representation of the second set of information.

Aspects of the present disclosure further provide a system comprising: at least one processor; and memory coupled to the at least one processor, the memory comprising computer executable instructions that, when executed by the at least one processor, performs a method for rendering phantom results, the method comprising: receiving a first query for data associated with one or more isolated collections; generating a first result set for the first query, wherein the first result set comprises: a first set of information comprising a first resource, a second resource, and a first relationship, wherein the first relationship describes a first association between the first resource and the second resource; and a second set of information comprising a third resource, a fourth resource, and a second relationship, wherein the second relationship describes a second association between the third resource and the fourth resource; using the first result set to generate a first graph, wherein the first graph comprises a visual representation of the first set of information and the second set of information; receiving a second query associated with the one or more isolated collections; generating a second result set for the second query, wherein the second result set comprises the first set of information; comparing the second result set to the first result set; determining the second set of information is absent from the second result set; and based on the determination, modifying the visual representation of the second set of information to indicate the absence, wherein the modification comprises increasing a transparency of the visual representation of the second set of information. In some examples, the method further comprises: receiving a third query associated with the one or more isolated collections; generating a third result set for the third query, wherein the third result set comprises the first set of information; comparing the third result set to the second result set; determining the second set of information is absent from the third result set; and based on the determination, modifying the visual representation of the second set of information to indicate the absence, wherein the modification comprises further increasing the transparency of the visual representation of the second set of information. In some examples, the method further comprises: receiving a third query associated with the one or more isolated collections; generating a third result set for the third query, wherein the third result set comprises the second set of information; comparing the third result set to the second result set; determining the second set of information is present in the third result set; and based on the determination, modifying the visual representation of the second set of information to indicate the presence, wherein the modification comprises decreasing the transparency of the visual representation of the second set of information. In some examples, the method further comprises: receiving a third query associated with the one or more isolated collections; generating a third result set for the third query, wherein the third result set comprises a third set of information comprising a fifth resource, a sixth resource, and a third relationship, wherein the third relationship describes a third association between the fifth resource and the sixth resource; comparing the third result set to the second result set; determining the third set of information is absent from the second result set; and based on the determination, adding a visual representation of the third set of information to the first graph such that the first graph comprises the visual representation of the first set of information, the visual representation of the second set of information having increased transparency, and the visual representation of the third set of information. In some examples, increasing the transparency of the visual representation of the second set of information includes setting the transparency to a value causing the visual representation of the second set of information to become fully transparent. In such example, the method may further comprise: receiving a third query associated with the one or more isolated collections; generating a third result set for the third query, wherein the third result set comprises at least the second set of information; comparing the third result set to the second result set; determining the second set of information is present in the third result set; and based on the determination, modifying the visual representation of the second set of information to indicate the presence of the second set of information, wherein the modification comprises decreasing the transparency of the visual representation of the second set of information.

Aspects of the present disclosure are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method for rendering phantom results, the method comprising:
   receiving a first query for data associated with one or more isolated collections;
   generating a first result set for the first query, wherein the first result set comprises a set of information;
   using the first result set to generate a first graph, wherein the first graph comprises a visual representation of the set of information;
   receiving a second query associated with the one or more isolated collections;
   generating a second result set for the second query;
   comparing the second result set to the first result set to determine a relevance of the set of information to the second result set; and
   when it is determined that the set of information is less relevant to the second result, generating a second graph comprising the visual representation, wherein the visual representation is modified to indicate the absence of the set of information, wherein the modification comprises increasing transparency of the visual representation.

2. The system of claim 1, wherein the set of information corresponds to one or more tuples, wherein the one or more tuples comprise at least one of a resource and a relationship in the one or more isolated collections.

3. The system of claim 1, wherein the first graph is a first graph database displaying the set of information using a first level of transparency, and the second graph is a second graph database displaying the set of information using a second level of transparency.

4. The system of claim 1, the method further comprising:
after generating the first result set, evaluating the first result set to identify the set of information; and
assigning one or more weights to the set of information, wherein the one or more weights represent the presence of the set of information in the first result set.

5. The system of claim 4, wherein generating the second result comprises:
determining whether the second result set comprises the information set; and
associating one or more weights with the determination.

6. The system of claim 5, wherein comparing the first result set to the second result set comprises using the one or more weights associated with determining whether the second result set comprises the information set to modify the one or more weights assigned to the first information set.

7. The system of claim 6, wherein the second graph is generated using the modified one or more weights assigned to the first information set.

8. The system of claim 1, wherein modifying the visual representation comprises reducing at least one property of the visual representation selected from the group consisting of color, size, line weight and line style.

9. A method for rendering phantom results, the method comprising:
receiving a first query for data associated with one or more isolated collections;
generating a first result set for the first query, wherein the first result set comprises:
a first set of information comprising a first resource, a second resource, and a first relationship, wherein the first relationship describes a first association between the first resource and the second resource; and
a second set of information comprising a third resource, a fourth resource, and a second relationship, wherein the second relationship describes a second association between the third resource and the fourth resource;
using the first result set to generate a first graph, wherein the first graph comprises a visual representation of the first set of information and the second set of information;
receiving a second query associated with the one or more isolated collections;
generating a second result set for the second query, wherein the second result set comprises the first set of information;
comparing the second result set to the first result set;
determining a relevance of the first set of information to the second set of information; and
based on the determination, modifying the visual representation of the second set of information to indicate the relevance, wherein the modification comprises increasing a transparency of the visual representation of the second set of information.

10. The method of claim 9, further comprising:
receiving a third query associated with the one or more isolated collections;
generating a third result set for the third query, wherein the third result set comprises the first set of information;
comparing the third result set to the second result set;
determining the second set of information is absent from the third result set; and
based on the determination, modifying the visual representation of the second set of information to indicate the absence, wherein the modification comprises further increasing the transparency of the visual representation of the second set of information.

11. The method of claim 9, further comprising:
receiving a third query associated with the one or more isolated collections;
generating a third result set for the third query, wherein the third result set comprises at least the second set of information;
comparing the third result set to the second result set;
determining the second set of information is present in the third result set; and
based on the determination, modifying the visual representation of the second set of information to indicate the presence, wherein the modification comprises decreasing the transparency of the visual representation of the second set of information.

12. The method of claim 9, further comprising:
receiving a third query associated with the one or more isolated collections;
generating a third result set for the third query, wherein the third result set comprises a third set of information comprising a fifth resource, a sixth resource, and a third relationship, wherein the third relationship describes a third association between the fifth resource and the sixth resource;
comparing the third result set to the second result set;
determining the third set of information is absent from the second result set; and
based on the determination, adding a visual representation of the third set of information to the first graph such that the first graph comprises the visual representation of the first set of information, the visual representation of the second set of information having increased transparency, and the visual representation of the third set of information.

13. The method of claim 9, wherein increasing the transparency of the visual representation of the second set of information includes setting the transparency to a value causing the visual representation of the second set of information to become fully transparent.

14. The method of claim 13, further comprising:
receiving a third query associated with the one or more isolated collections;
generating a third result set for the third query, wherein the third result set comprises at least the second set of information;
comparing the third result set to the second result set;
determining the second set of information is present in the third result set; and
based on the determination, modifying the visual representation of the second set of information to indicate the presence of the second set of information, wherein the modification comprises decreasing the transparency of the visual representation of the second set of information.

15. A system comprising:
at least one processor; and
memory coupled to the at least one processor, the memory comprising computer executable instructions that, when executed by the at least one processor, performs a method for rendering phantom results, the method comprising:

receiving a first query for data associated with one or more isolated collections;

generating a first result set for the first query, wherein the first result set comprises:
- a first set of information comprising a first resource, a second resource, and a first relationship, wherein the first relationship describes a first association between the first resource and the second resource; and
- a second set of information comprising a third resource, a fourth resource, and a second relationship, wherein the second relationship describes a second association between the third resource and the fourth resource;

using the first result set to generate a first graph, wherein the first graph comprises a visual representation of the first set of information and the second set of information;

receiving a second query associated with the one or more isolated collections;

generating a second result set for the second query, wherein the second result set comprises the first set of information;

comparing the second result set to the first result set;

determining a relevance of the first set of information to the second set of information; and based on the determination, modifying the visual representation of the second set of information to indicate the absence, wherein the modification comprises increasing a transparency of the visual representation of the second set of information.

16. The system of claim 15, the method further comprising:
receiving a third query associated with the one or more isolated collections;
generating a third result set for the third query, wherein the third result set comprises the first set of information;
comparing the third result set to the second result set;
determining the second set of information is absent from the third result set; and
based on the determination, modifying the visual representation of the second set of information to indicate the absence, wherein the modification comprises further increasing the transparency of the visual representation of the second set of information.

17. The system of claim 15, the method further comprising:
receiving a third query associated with the one or more isolated collections;
generating a third result set for the third query, wherein the third result set comprises at least the second set of information;
comparing the third result set to the second result set;
determining the second set of information is present in the third result set; and
based on the determination, modifying the visual representation of the second set of information to indicate the presence, wherein the modification comprises decreasing the transparency of the visual representation of the second set of information.

18. The system of claim 15, the method further comprising:
receiving a third query associated with the one or more isolated collections;
generating a third result set for the third query, wherein the third result set comprises a third set of information comprising a fifth resource, a sixth resource, and a third relationship, wherein the third relationship describes a third association between the fifth resource and the sixth resource;
comparing the third result set to the second result set;
determining the third set of information is absent from the second result set; and
based on the determination, adding a visual representation of the third set of information to the first graph such that the first graph comprises the visual representation of the first set of information, the visual representation of the second set of information having increased transparency, and the visual representation of the third set of information.

19. The system of claim 15, wherein increasing the transparency of the visual representation of the second set of information includes setting the transparency to a value causing the visual representation of the second set of information to become fully transparent.

20. The system of claim 19, the method further comprising:
receiving a third query associated with the one or more isolated collections;
generating a third result set for the third query, wherein the third result set comprises at least the second set of information;
comparing the third result set to the second result set;
determining the second set of information is present in the third result set; and
based on the determination, modifying the visual representation of the second set of information to indicate the presence, wherein the modification comprises decreasing the transparency of the visual representation of the second set of information.

* * * * *